United States Patent
Jakoboski et al.

(10) Patent No.: US 10,156,889 B2
(45) Date of Patent: Dec. 18, 2018

(54) INDUCTIVE PERIPHERAL RETENTION DEVICE

(71) Applicant: Microsoft Technology Licensing, LLC, Redmond, WA (US)

(72) Inventors: Timothy Allen Jakoboski, Woodinville, WA (US); Shiu Sang Ng, Kirkland, WA (US); William H. Standing, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 179 days.

(21) Appl. No.: 15/209,539

(22) Filed: Jul. 13, 2016

(65) Prior Publication Data

US 2016/0320830 A1    Nov. 3, 2016

Related U.S. Application Data

(62) Division of application No. 14/486,381, filed on Sep. 15, 2014, now Pat. No. 9,424,048.

(51) Int. Cl.
  *G06F 13/10*  (2006.01)
  *G06F 9/44*   (2018.01)
  (Continued)

(52) U.S. Cl.
  CPC ............ *G06F 1/3287* (2013.01); *G06F 1/266* (2013.01); *G06F 3/03545* (2013.01);
  (Continued)

(58) Field of Classification Search
  CPC ...... G06F 13/102; G06F 1/266; G06F 1/3287; G06F 2200/1632; G06F 3/03545;
  (Continued)

(56) References Cited

U.S. PATENT DOCUMENTS 578,325 A   3/1897  Fleming
3,879,586 A 4/1975  DuRocher et al.
(Continued)

FOREIGN PATENT DOCUMENTS

CA   990023   6/1976
CH   687757   2/1997
(Continued)

OTHER PUBLICATIONS

"Corrected Notice of Allowance", U.S. Appl. No. 14/450,023, dated Oct. 28, 2016, 2 pages.
(Continued)

*Primary Examiner* — Terrell S Johnson
(74) *Attorney, Agent, or Firm* — Rainier Patents, P.S.

(57) ABSTRACT

Inductive peripheral retention device techniques are described. In one or more implementations, an apparatus includes a plug configured to removably engage a communication port of a device to form a communicative coupling with the device. The plug is securable to and removable from the device using one or more hands of a user. The apparatus also includes a peripheral securing portion connected to the plug and configured to removably engage a peripheral device via an inductive element formed as a flexible loop and configured to form a communicative coupling between the peripheral device and the device, which may be used to support charging of the apparatus.

20 Claims, 12 Drawing Sheets

(51) Int. Cl.
*G06F 1/32* (2006.01)
*G06F 3/0354* (2013.01)
*H02J 50/10* (2016.01)
*G06F 9/4401* (2018.01)
*H01R 31/06* (2006.01)
*G06F 1/26* (2006.01)
*H02J 7/02* (2016.01)
*H02J 7/00* (2006.01)

(52) U.S. Cl.
CPC .......... *G06F 9/4413* (2013.01); *G06F 13/102* (2013.01); *H01R 31/065* (2013.01); *H02J 7/0042* (2013.01); *H02J 7/025* (2013.01); *H02J 50/10* (2016.02); *G06F 2200/1632* (2013.01)

(58) Field of Classification Search
CPC ..... G06F 9/4413; G06F 3/038; H01R 31/065; H02J 50/10; H02J 7/0042; H02J 7/025
See application file for complete search history.

(56) References Cited

U.S. PATENT DOCUMENTS

| | | |
|---|---|---|
| 4,046,975 A | 9/1977 | Seeger, Jr. |
| 4,065,649 A | 12/1977 | Carter et al. |
| 4,086,451 A | 4/1978 | Boulanger |
| 4,243,861 A | 1/1981 | Strandwitz |
| 4,279,021 A | 7/1981 | See et al. |
| 4,302,648 A | 11/1981 | Sado et al. |
| 4,317,013 A | 2/1982 | Larson |
| 4,326,193 A | 4/1982 | Markley et al. |
| 4,365,130 A | 12/1982 | Christensen |
| 4,492,829 A | 1/1985 | Rodrique |
| 4,527,021 A | 7/1985 | Morikawa et al. |
| 4,559,426 A | 12/1985 | Van Zeeland et al. |
| 4,577,822 A | 3/1986 | Wilkerson |
| 4,588,187 A | 5/1986 | Dell |
| 4,607,147 A | 8/1986 | Ono et al. |
| 4,651,133 A | 3/1987 | Ganesan et al. |
| 4,735,394 A | 4/1988 | Facco |
| 4,890,832 A | 1/1990 | Komaki |
| 5,008,497 A | 4/1991 | Asher |
| 5,021,638 A | 6/1991 | Nopper et al. |
| 5,128,829 A | 7/1992 | Loew |
| 5,220,521 A | 6/1993 | Kikinis |
| 5,283,559 A | 2/1994 | Kalendra et al. |
| 5,331,443 A | 7/1994 | Stanisci |
| 5,340,528 A | 8/1994 | Machida et al. |
| 5,363,075 A | 11/1994 | Fanucchi |
| 5,375,076 A | 12/1994 | Goodrich et al. |
| 5,480,118 A | 1/1996 | Cross |
| 5,489,900 A | 2/1996 | Cali et al. |
| 5,510,783 A | 4/1996 | Findlater et al. |
| 5,546,271 A | 8/1996 | Gut et al. |
| 5,548,477 A | 8/1996 | Kumar et al. |
| 5,558,577 A | 9/1996 | Kato |
| 5,576,981 A | 11/1996 | Parker et al. |
| 5,618,232 A | 4/1997 | Martin |
| 5,666,112 A | 9/1997 | Crowley et al. |
| 5,681,220 A | 10/1997 | Bertram et al. |
| 5,719,898 A | 2/1998 | Davidovici et al. |
| 5,737,183 A | 4/1998 | Kobayashi et al. |
| 5,745,376 A | 4/1998 | Barker et al. |
| 5,748,114 A | 5/1998 | Koehn |
| 5,781,406 A | 7/1998 | Hunte |
| 5,807,175 A | 9/1998 | Davis et al. |
| 5,818,361 A | 10/1998 | Acevedo |
| 5,828,770 A | 10/1998 | Leis et al. |
| 5,842,027 A | 11/1998 | Oprescu et al. |
| 5,861,990 A | 1/1999 | Tedesco |
| 5,874,697 A | 2/1999 | Selker et al. |
| 5,905,485 A | 5/1999 | Podoloff |
| 5,924,555 A | 7/1999 | Sadamori et al. |
| 5,926,170 A | 7/1999 | Oba |
| 5,942,733 A | 8/1999 | Allen et al. |
| 5,957,191 A | 9/1999 | Okada et al. |
| 5,971,635 A | 10/1999 | Wise |
| 5,973,677 A | 10/1999 | Gibbons |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,042,075 A | 3/2000 | Burch, Jr. |
| 6,044,717 A | 4/2000 | Biegelsen et al. |
| 6,061,644 A | 5/2000 | Leis |
| 6,108,200 A | 8/2000 | Fullerton |
| 6,112,797 A | 9/2000 | Colson et al. |
| 6,128,007 A | 10/2000 | Seybold |
| 6,147,859 A | 11/2000 | Abboud |
| 6,178,443 B1 | 1/2001 | Lin |
| 6,188,391 B1 | 2/2001 | Seely et al. |
| 6,239,786 B1 | 5/2001 | Burry et al. |
| 6,254,105 B1 | 7/2001 | Rinde et al. |
| 6,266,685 B1 | 7/2001 | Danielson et al. |
| 6,279,060 B1 | 8/2001 | Luke et al. |
| 6,329,617 B1 | 12/2001 | Burgess |
| 6,337,924 B1 | 1/2002 | Smith |
| 6,338,655 B1 | 1/2002 | Masse et al. |
| 6,344,791 B1 | 2/2002 | Armstrong |
| 6,366,440 B1 | 4/2002 | Kung |
| 6,380,497 B1 | 4/2002 | Hashimoto et al. |
| 6,437,682 B1 | 8/2002 | Vance |
| 6,442,764 B1 | 9/2002 | Badillo et al. |
| 6,450,046 B1 | 9/2002 | Maeda |
| 6,468,090 B2 | 10/2002 | Belopolsky et al. |
| 6,469,755 B1 | 10/2002 | Adachi et al. |
| 6,506,983 B1 | 1/2003 | Babb et al. |
| 6,511,378 B1 | 1/2003 | Bhatt et al. |
| 6,532,147 B1 | 3/2003 | Christ, Jr. |
| 6,543,949 B1 | 4/2003 | Ritchey et al. |
| 6,565,439 B2 | 5/2003 | Shinohara et al. |
| 6,585,435 B2 | 7/2003 | Fang |
| 6,597,347 B1 | 7/2003 | Yasutake |
| 6,600,121 B1 | 7/2003 | Olodort et al. |
| 6,603,408 B1 | 8/2003 | Gaba |
| 6,608,664 B1 | 8/2003 | Hasegawa |
| 6,617,536 B2 | 9/2003 | Kawaguchi |
| 6,651,943 B2 | 11/2003 | Cho et al. |
| 6,675,865 B1 | 1/2004 | Yoshida |
| 6,685,369 B2 | 2/2004 | Lien |
| 6,691,176 B1 | 2/2004 | Narin et al. |
| 6,695,273 B2 | 2/2004 | Iguchi |
| 6,704,864 B1 | 3/2004 | Philyaw |
| 6,721,019 B2 | 4/2004 | Kono et al. |
| 6,725,318 B1 | 4/2004 | Sherman et al. |
| 6,738,049 B2 | 5/2004 | Kiser et al. |
| 6,758,615 B2 | 7/2004 | Monney et al. |
| 6,774,888 B1 | 8/2004 | Genduso |
| 6,776,546 B2 | 8/2004 | Kraus et al. |
| 6,780,019 B1 | 8/2004 | Ghosh et al. |
| 6,781,819 B2 | 8/2004 | Yang et al. |
| 6,784,869 B1 | 8/2004 | Clark et al. |
| 6,813,143 B2 | 11/2004 | Makela |
| 6,819,316 B2 | 11/2004 | Schulz et al. |
| 6,819,547 B2 | 11/2004 | Minaguchi et al. |
| 6,856,506 B2 | 2/2005 | Doherty et al. |
| 6,861,961 B2 | 3/2005 | Sandbach et al. |
| 6,864,573 B2 | 3/2005 | Robertson et al. |
| 6,898,315 B2 | 5/2005 | Guha |
| 6,909,354 B2 | 6/2005 | Baker et al. |
| 6,914,197 B2 | 7/2005 | Doherty et al. |
| 6,918,066 B2 | 7/2005 | Dutta et al. |
| 6,950,950 B2 | 9/2005 | Sawyers et al. |
| 6,962,454 B1 | 11/2005 | Costello |
| 6,970,957 B1 | 11/2005 | Oshins et al. |
| 6,976,799 B2 | 12/2005 | Kim et al. |
| 7,007,238 B2 | 2/2006 | Glaser |
| 7,051,149 B2 | 5/2006 | Wang et al. |
| 7,055,146 B1 | 5/2006 | Durr et al. |
| 7,066,634 B2 | 6/2006 | Kitamura et al. |
| 7,083,295 B1 | 8/2006 | Hanna |
| 7,091,436 B2 | 8/2006 | Serban |
| 7,091,955 B2 | 8/2006 | Kramer |

(56) References Cited

U.S. PATENT DOCUMENTS

| | | |
|---|---|---|
| 7,095,404 B2 | 8/2006 | Vincent et al. |
| 7,099,149 B2 | 8/2006 | Krieger et al. |
| 7,106,222 B2 | 9/2006 | Ward et al. |
| 7,116,309 B1 | 10/2006 | Kimura et al. |
| 7,123,292 B1 | 10/2006 | Seeger et al. |
| 7,151,795 B1 | 12/2006 | Goldburg |
| 7,152,985 B2 | 12/2006 | Benitez et al. |
| D535,292 S | 1/2007 | Shi et al. |
| 7,194,662 B2 | 3/2007 | Do et al. |
| 7,202,837 B2 | 4/2007 | Ihara |
| 7,213,323 B2 | 5/2007 | Baker et al. |
| 7,213,991 B2 | 5/2007 | Chapman et al. |
| 7,218,830 B2 | 5/2007 | Iimura |
| 7,224,830 B2 | 5/2007 | Nefian et al. |
| 7,239,505 B2 | 7/2007 | Keely et al. |
| 7,252,512 B2 | 8/2007 | Tai et al. |
| 7,260,221 B1 | 8/2007 | Atsmon |
| 7,277,087 B2 | 10/2007 | Hill et al. |
| 7,280,348 B2 | 10/2007 | Ghosh |
| 7,301,759 B2 | 11/2007 | Hsiung |
| 7,365,967 B2 | 4/2008 | Zheng |
| 7,374,312 B2 | 5/2008 | Feng et al. |
| 7,400,805 B2 | 7/2008 | Abu-Ageel |
| 7,401,992 B1 | 7/2008 | Lin |
| 7,423,557 B2 | 9/2008 | Kang |
| 7,437,193 B2 | 10/2008 | Parramon et al. |
| 7,447,934 B2 | 11/2008 | Dasari et al. |
| 7,457,108 B2 | 11/2008 | Ghosh |
| 7,469,386 B2 | 12/2008 | Bear et al. |
| 7,486,165 B2 | 2/2009 | Ligtenberg et al. |
| 7,499,037 B2 | 3/2009 | Lube |
| 7,502,803 B2 | 3/2009 | Culter et al. |
| 7,535,874 B2 | 5/2009 | Ozluturk et al. |
| 7,542,052 B2 | 6/2009 | Solomon et al. |
| 7,558,594 B2 | 7/2009 | Wilson |
| 7,559,834 B1 | 7/2009 | York |
| RE40,891 E | 9/2009 | Yasutake |
| 7,620,244 B1 | 11/2009 | Collier |
| 7,622,907 B2 | 11/2009 | Vranish |
| 7,623,121 B2 | 11/2009 | Dodge |
| 7,626,358 B2 | 12/2009 | Lam et al. |
| 7,636,921 B2 | 12/2009 | Louie |
| 7,639,329 B2 | 12/2009 | Takeda et al. |
| 7,639,876 B2 | 12/2009 | Clary et al. |
| 7,653,893 B2 | 1/2010 | Neumann et al. |
| 7,656,392 B2 | 2/2010 | Bolender |
| 7,681,208 B1 | 3/2010 | Pantuso et al. |
| 7,686,066 B2 | 3/2010 | Hirao |
| 7,686,694 B2 | 3/2010 | Cole |
| 7,722,792 B2 | 5/2010 | Uezaki et al. |
| 7,728,923 B2 | 6/2010 | Kim et al. |
| 7,729,493 B2 | 6/2010 | Krieger et al. |
| 7,731,147 B2 | 6/2010 | Rha |
| 7,733,326 B1 | 6/2010 | Adiseshan |
| 7,773,076 B2 | 8/2010 | Pittel et al. |
| 7,773,121 B1 | 8/2010 | Huntsberger et al. |
| 7,774,155 B2 | 8/2010 | Sato et al. |
| 7,777,972 B1 | 8/2010 | Chen et al. |
| 7,782,342 B2 | 8/2010 | Koh |
| 7,813,715 B2 | 10/2010 | McKillop et al. |
| 7,815,358 B2 | 10/2010 | Inditsky |
| 7,817,428 B2 | 10/2010 | Greer, Jr. et al. |
| 7,822,338 B2 | 10/2010 | Wernersson |
| 7,853,646 B2 | 12/2010 | Black et al. |
| 7,865,639 B2 | 1/2011 | McCoy et al. |
| 7,884,807 B2 | 2/2011 | Hovden et al. |
| 7,893,921 B2 | 2/2011 | Sato |
| 7,905,753 B2 | 3/2011 | Siev et al. |
| 7,907,394 B2 | 3/2011 | Richardson et al. |
| D636,397 S | 4/2011 | Green |
| 7,921,430 B2 | 4/2011 | Johnson et al. |
| 7,928,964 B2 | 4/2011 | Kolmykov-Zotov et al. |
| 7,932,890 B2 | 4/2011 | Onikiri et al. |
| 7,936,501 B2 | 5/2011 | Smith et al. |
| 7,944,520 B2 | 5/2011 | Ichioka et al. |
| 7,945,717 B2 | 5/2011 | Rivalsi |
| 7,953,295 B2 | 5/2011 | Vincent et al. |
| 7,967,462 B2 | 6/2011 | Ogiro et al. |
| 7,970,246 B2 | 6/2011 | Travis et al. |
| 7,973,771 B2 | 7/2011 | Geaghan |
| 7,976,393 B2 | 7/2011 | Haga et al. |
| 7,978,281 B2 | 7/2011 | Vergith et al. |
| 8,016,255 B2 | 9/2011 | Lin |
| 8,018,386 B2 | 9/2011 | Qi et al. |
| 8,018,579 B1 | 9/2011 | Krah |
| 8,022,939 B2 | 9/2011 | Hinata |
| 8,026,904 B2 | 9/2011 | Westerman |
| 8,053,688 B2 | 11/2011 | Conzola et al. |
| 8,059,384 B2 | 11/2011 | Park et al. |
| 8,063,886 B2 | 11/2011 | Serban et al. |
| 8,065,624 B2 | 11/2011 | Morin et al. |
| 8,069,356 B2 | 11/2011 | Rathi et al. |
| 8,077,160 B2 | 12/2011 | Land et al. |
| 8,090,225 B2 | 1/2012 | Lapstun et al. |
| 8,090,885 B2 | 1/2012 | Callaghan et al. |
| 8,094,134 B2 | 1/2012 | Suzuki et al. |
| 8,098,233 B2 | 1/2012 | Hotelling et al. |
| 8,115,499 B2 | 2/2012 | Osoinach et al. |
| 8,117,362 B2 | 2/2012 | Rodriguez et al. |
| 8,118,274 B2 | 2/2012 | McClure et al. |
| 8,118,681 B2 | 2/2012 | Mattice et al. |
| 8,120,166 B2 | 2/2012 | Koizumi et al. |
| 8,130,203 B2 | 3/2012 | Westerman |
| 8,141,059 B2 | 3/2012 | Ding et al. |
| 8,149,219 B2 | 4/2012 | Lii et al. |
| 8,154,524 B2 | 4/2012 | Wilson et al. |
| 8,162,282 B2 | 4/2012 | Hu et al. |
| D659,139 S | 5/2012 | Gengler |
| 8,169,421 B2 | 5/2012 | Wright et al. |
| 8,175,613 B2 | 5/2012 | Patil et al. |
| 8,189,973 B2 | 5/2012 | Travis et al. |
| 8,216,074 B2 | 7/2012 | Sakuma |
| 8,229,509 B2 | 7/2012 | Paek et al. |
| 8,229,522 B2 | 7/2012 | Kim et al. |
| 8,231,099 B2 | 7/2012 | Chen |
| 8,248,791 B2 | 8/2012 | Wang et al. |
| 8,255,708 B1 | 8/2012 | Zhang |
| 8,264,310 B2 | 9/2012 | Lauder et al. |
| 8,267,368 B2 | 9/2012 | Torii et al. |
| 8,269,093 B2 | 9/2012 | Naik et al. |
| 8,269,731 B2 | 9/2012 | Molne |
| 8,274,784 B2 | 9/2012 | Franz et al. |
| 8,279,589 B2 | 10/2012 | Kim |
| 8,322,290 B1 | 12/2012 | Mignano |
| 8,330,061 B2 | 12/2012 | Rothkopf et al. |
| 8,330,742 B2 | 12/2012 | Reynolds et al. |
| 8,363,036 B2 | 1/2013 | Liang |
| 8,370,629 B1 | 2/2013 | Ngo et al. |
| 8,373,664 B2 | 2/2013 | Wright |
| 8,387,078 B2 | 2/2013 | Memmott |
| 8,401,054 B2 | 3/2013 | Myers et al. |
| 8,403,576 B2 | 3/2013 | Merz |
| 8,416,559 B2 | 4/2013 | Agata et al. |
| 8,432,939 B2 | 4/2013 | Bhattad et al. |
| 8,498,100 B1 | 7/2013 | Whitt, III et al. |
| 8,509,563 B2 | 8/2013 | Robinson et al. |
| 8,537,851 B1 | 9/2013 | Gossett et al. |
| 8,543,227 B1 | 9/2013 | Perek et al. |
| 8,548,608 B2 | 10/2013 | Perek et al. |
| 8,564,944 B2 | 10/2013 | Whitt, III et al. |
| 8,570,725 B2 | 10/2013 | Whitt, III et al. |
| 8,599,542 B1 | 12/2013 | Healey et al. |
| 8,606,293 B2 | 12/2013 | Kim et al. |
| 8,610,015 B2 | 12/2013 | Whitt et al. |
| 8,614,666 B2 | 12/2013 | Whitman et al. |
| 8,634,386 B2 | 1/2014 | Jagger et al. |
| 8,634,849 B2 | 1/2014 | Jovicic et al. |
| 8,638,315 B2 | 1/2014 | Algreatly |
| 8,639,266 B2 | 1/2014 | Zelinka |
| 8,646,999 B2 | 2/2014 | Shaw et al. |
| 8,654,030 B1 | 2/2014 | Mercer |
| 8,655,944 B2 | 2/2014 | Silbey et al. |
| 8,699,215 B2 | 4/2014 | Whitt, III et al. |
| 8,700,060 B2 | 4/2014 | Huang |

(56) References Cited

U.S. PATENT DOCUMENTS

| | | |
|---|---|---|
| 8,719,603 B2 | 5/2014 | Belesiu |
| 8,724,302 B2 | 5/2014 | Whitt et al. |
| 8,757,374 B1 | 6/2014 | Kaiser |
| 8,780,541 B2 | 7/2014 | Whitt et al. |
| 8,791,382 B2 | 7/2014 | Whitt, III et al. |
| 8,794,987 B2 | 8/2014 | Classen et al. |
| 8,830,668 B2 | 9/2014 | Whit, III et al. |
| 8,850,241 B2 | 9/2014 | Oler et al. |
| 8,854,799 B2 | 10/2014 | Whitt, III et al. |
| 8,873,227 B2 | 10/2014 | Whitt et al. |
| 9,063,693 B2 | 6/2015 | Raken et al. |
| 9,073,123 B2 | 7/2015 | Campbell et al. |
| 9,126,514 B2 | 9/2015 | Soar |
| 9,268,379 B2 | 2/2016 | Ashcraft et al. |
| 9,318,898 B2 | 4/2016 | John |
| 9,360,893 B2 | 6/2016 | Bathiche et al. |
| 9,397,723 B2 | 7/2016 | Hassan et al. |
| 9,424,048 B2 | 8/2016 | Jakoboski et al. |
| 9,513,671 B2 | 12/2016 | Huston et al. |
| 9,780,573 B2 | 10/2017 | McCauley et al. |
| 2001/0009545 A1 | 7/2001 | Schilling |
| 2001/0023818 A1 | 9/2001 | Masaru et al. |
| 2001/0033218 A1 | 10/2001 | Murata et al. |
| 2001/0035859 A1 | 11/2001 | Kiser |
| 2002/0000977 A1 | 1/2002 | Vranish |
| 2002/0015437 A1 | 2/2002 | Li et al. |
| 2002/0036253 A1 | 3/2002 | Lake |
| 2002/0044216 A1 | 4/2002 | Cha |
| 2002/0126445 A1 | 9/2002 | Minaguchi et al. |
| 2002/0134828 A1 | 9/2002 | Sandbach et al. |
| 2002/0135457 A1 | 9/2002 | Sandbach et al. |
| 2002/0154099 A1 | 10/2002 | Oh |
| 2002/0163510 A1 | 11/2002 | Williams et al. |
| 2002/0186710 A1 | 12/2002 | Alvesalo et al. |
| 2002/0187799 A1 | 12/2002 | Haartsen |
| 2003/0011576 A1 | 1/2003 | Sandbach et al. |
| 2003/0016282 A1 | 1/2003 | Koizumi |
| 2003/0044215 A1 | 3/2003 | Monney et al. |
| 2003/0051983 A1 | 3/2003 | Lahr |
| 2003/0061283 A1 | 3/2003 | Dutta et al. |
| 2003/0072467 A1 | 4/2003 | Brundage et al. |
| 2003/0088716 A1 | 5/2003 | Sanders |
| 2003/0108720 A1 | 6/2003 | Kashino |
| 2003/0110296 A1 | 6/2003 | Kirsch et al. |
| 2003/0126311 A1 | 7/2003 | Kushnirskiy et al. |
| 2003/0132916 A1 | 7/2003 | Kramer |
| 2003/0163611 A1 | 8/2003 | Nagao |
| 2003/0179731 A1 | 9/2003 | Noguchi et al. |
| 2003/0197687 A1 | 10/2003 | Shetter |
| 2003/0231243 A1 | 12/2003 | Shibutani |
| 2004/0005184 A1 | 1/2004 | Kim et al. |
| 2004/0006850 A1 | 1/2004 | Wax |
| 2004/0027387 A1 | 2/2004 | Nason et al. |
| 2004/0031030 A1 | 2/2004 | Kidder et al. |
| 2004/0056843 A1 | 3/2004 | Lin et al. |
| 2004/0095333 A1 | 5/2004 | Morag et al. |
| 2004/0100457 A1 | 5/2004 | Mandle |
| 2004/0120290 A1 | 6/2004 | Makhijani et al. |
| 2004/0156168 A1 | 8/2004 | LeVasseur et al. |
| 2004/0160734 A1 | 8/2004 | Yim |
| 2004/0169641 A1 | 9/2004 | Bean et al. |
| 2004/0174670 A1 | 9/2004 | Huang et al. |
| 2004/0174709 A1 | 9/2004 | Buelow, II et al. |
| 2004/0190239 A1 | 9/2004 | Weng et al. |
| 2004/0212598 A1 | 10/2004 | Kraus et al. |
| 2004/0212601 A1 | 10/2004 | Cake et al. |
| 2004/0258924 A1 | 12/2004 | Berger et al. |
| 2004/0267323 A1 | 12/2004 | Dupelle |
| 2004/0268000 A1 | 12/2004 | Barker et al. |
| 2005/0030728 A1 | 2/2005 | Kawashima et al. |
| 2005/0052831 A1 | 3/2005 | Chen |
| 2005/0055498 A1 | 3/2005 | Beckert et al. |
| 2005/0057515 A1 | 3/2005 | Bathiche |
| 2005/0057521 A1 | 3/2005 | Aull et al. |
| 2005/0059441 A1 | 3/2005 | Miyashita |
| 2005/0059489 A1 | 3/2005 | Kim |
| 2005/0062715 A1 | 3/2005 | Tsuji et al. |
| 2005/0094604 A1 | 5/2005 | Ozluturk et al. |
| 2005/0099400 A1 | 5/2005 | Lee |
| 2005/0134717 A1 | 6/2005 | Misawa |
| 2005/0146512 A1 | 7/2005 | Hill et al. |
| 2005/0157459 A1 | 7/2005 | Yin et al. |
| 2005/0190159 A1 | 9/2005 | Skarine |
| 2005/0236848 A1 | 10/2005 | Kim |
| 2005/0240949 A1 | 10/2005 | Liu et al. |
| 2005/0264653 A1 | 12/2005 | Starkweather et al. |
| 2005/0264988 A1 | 12/2005 | Nicolosi |
| 2005/0281321 A1 | 12/2005 | Bergstrom et al. |
| 2005/0285703 A1 | 12/2005 | Wheeler et al. |
| 2006/0002101 A1 | 1/2006 | Wheatley et al. |
| 2006/0012567 A1 | 1/2006 | Sicklinger |
| 2006/0049993 A1 | 3/2006 | Lin et al. |
| 2006/0081714 A1 | 4/2006 | King et al. |
| 2006/0082973 A1 | 4/2006 | Egbert et al. |
| 2006/0085658 A1 | 4/2006 | Allen et al. |
| 2006/0089171 A1 | 4/2006 | Yoo et al. |
| 2006/0092139 A1 | 5/2006 | Sharma |
| 2006/0096392 A1 | 5/2006 | Inkster et al. |
| 2006/0102914 A1 | 5/2006 | Smits et al. |
| 2006/0103633 A1 | 5/2006 | Gioeli |
| 2006/0125799 A1 | 6/2006 | Hillis et al. |
| 2006/0132423 A1 | 6/2006 | Travis |
| 2006/0154725 A1 | 7/2006 | Glaser et al. |
| 2006/0156415 A1 | 7/2006 | Rubinstein et al. |
| 2006/0181514 A1 | 8/2006 | Newman |
| 2006/0181521 A1 | 8/2006 | Perreault et al. |
| 2006/0187216 A1 | 8/2006 | Trent, Jr. et al. |
| 2006/0189353 A1 | 8/2006 | Fujishima |
| 2006/0195522 A1 | 8/2006 | Miyazaki |
| 2006/0197755 A1 | 9/2006 | Bawany |
| 2006/0227393 A1 | 10/2006 | Herloski |
| 2006/0238510 A1 | 10/2006 | Panotopoulos et al. |
| 2006/0239006 A1 | 10/2006 | Chaves et al. |
| 2006/0248597 A1 | 11/2006 | Keneman |
| 2006/0254042 A1 | 11/2006 | Chou et al. |
| 2006/0265617 A1 | 11/2006 | Priborsky |
| 2006/0270351 A1 | 11/2006 | Lastinger et al. |
| 2006/0272429 A1 | 12/2006 | Ganapathi et al. |
| 2007/0003267 A1 | 1/2007 | Shibutani |
| 2007/0022390 A1 | 1/2007 | Hillis et al. |
| 2007/0047221 A1 | 3/2007 | Park |
| 2007/0047260 A1 | 3/2007 | Lee et al. |
| 2007/0051766 A1 | 3/2007 | Spencer |
| 2007/0051792 A1 | 3/2007 | Wheeler et al. |
| 2007/0056385 A1 | 3/2007 | Lorenz |
| 2007/0062089 A1 | 3/2007 | Homer et al. |
| 2007/0069153 A1 | 3/2007 | Pai-Paranjape et al. |
| 2007/0072474 A1 | 3/2007 | Beasley et al. |
| 2007/0117600 A1 | 5/2007 | Robertson et al. |
| 2007/0145945 A1 | 6/2007 | McGinley et al. |
| 2007/0147226 A1 | 6/2007 | Khandekar et al. |
| 2007/0152983 A1 | 7/2007 | McKillop et al. |
| 2007/0172229 A1 | 7/2007 | Wernersson |
| 2007/0174846 A1 | 7/2007 | Johnson et al. |
| 2007/0176902 A1 | 8/2007 | Newman et al. |
| 2007/0180441 A1 | 8/2007 | Ding et al. |
| 2007/0182663 A1 | 8/2007 | Biech |
| 2007/0182722 A1 | 8/2007 | Hotelling et al. |
| 2007/0185590 A1 | 8/2007 | Reindel et al. |
| 2007/0188478 A1 | 8/2007 | Silverstein et al. |
| 2007/0200830 A1 | 8/2007 | Yamamoto |
| 2007/0220708 A1 | 9/2007 | Lewis |
| 2007/0230227 A1 | 10/2007 | Palmer |
| 2007/0234420 A1 | 10/2007 | Novotney et al. |
| 2007/0236408 A1 | 10/2007 | Yamaguchi et al. |
| 2007/0236475 A1 | 10/2007 | Wherry |
| 2007/0236873 A1 | 10/2007 | Yukawa et al. |
| 2007/0247338 A1 | 10/2007 | Marchetto |
| 2007/0247432 A1 | 10/2007 | Oakley |
| 2007/0257821 A1 | 11/2007 | Son et al. |
| 2007/0260892 A1 | 11/2007 | Paul et al. |
| 2007/0274094 A1 | 11/2007 | Schultz et al. |
| 2007/0274095 A1 | 11/2007 | Destain |
| 2007/0283048 A1 | 12/2007 | Theimer et al. |

(56) References Cited

U.S. PATENT DOCUMENTS

| | | |
|---|---|---|
| 2007/0283179 A1 | 12/2007 | Burnett et al. |
| 2007/0296709 A1 | 12/2007 | Guanghai |
| 2007/0297323 A1 | 12/2007 | Seki |
| 2008/0005423 A1 | 1/2008 | Jacobs et al. |
| 2008/0013809 A1 | 1/2008 | Zhu et al. |
| 2008/0018611 A1 | 1/2008 | Serban et al. |
| 2008/0024502 A1 | 1/2008 | Nagahara et al. |
| 2008/0053222 A1 | 3/2008 | Ehrensvard et al. |
| 2008/0059888 A1 | 3/2008 | Dunko |
| 2008/0074398 A1 | 3/2008 | Wright |
| 2008/0077855 A1 | 3/2008 | Lev et al. |
| 2008/0077941 A1 | 3/2008 | Holmes et al. |
| 2008/0080166 A1 | 4/2008 | Duong et al. |
| 2008/0094367 A1 | 4/2008 | Van De Ven et al. |
| 2008/0104233 A1 | 5/2008 | Smith et al. |
| 2008/0104437 A1 | 5/2008 | Lee |
| 2008/0104580 A1 | 5/2008 | Wilkinson |
| 2008/0151478 A1 | 6/2008 | Chern |
| 2008/0158185 A1 | 7/2008 | Westerman |
| 2008/0165754 A1 | 7/2008 | Hu |
| 2008/0167832 A1 | 7/2008 | Soss |
| 2008/0174570 A1 | 7/2008 | Jobs et al. |
| 2008/0180411 A1 | 7/2008 | Solomon et al. |
| 2008/0186660 A1 | 8/2008 | Yang |
| 2008/0215796 A1 | 9/2008 | Lam et al. |
| 2008/0219025 A1 | 9/2008 | Spitzer et al. |
| 2008/0224659 A1 | 9/2008 | Singh |
| 2008/0228969 A1 | 9/2008 | Cheah et al. |
| 2008/0232061 A1 | 9/2008 | Wang et al. |
| 2008/0238884 A1 | 10/2008 | Harish |
| 2008/0253822 A1 | 10/2008 | Matias |
| 2008/0297878 A1 | 12/2008 | Brown et al. |
| 2008/0307242 A1 | 12/2008 | Qu |
| 2008/0309636 A1 | 12/2008 | Feng et al. |
| 2008/0316002 A1 | 12/2008 | Brunet et al. |
| 2008/0316183 A1 | 12/2008 | Westerman et al. |
| 2008/0320190 A1 | 12/2008 | Lydon et al. |
| 2009/0002218 A1 | 1/2009 | Rigazio et al. |
| 2009/0007001 A1 | 1/2009 | Morin et al. |
| 2009/0009476 A1 | 1/2009 | Daley, III |
| 2009/0046416 A1 | 2/2009 | Daley, III |
| 2009/0049979 A1 | 2/2009 | Naik et al. |
| 2009/0065267 A1 | 3/2009 | Sato |
| 2009/0067156 A1 | 3/2009 | Bonnett et al. |
| 2009/0073060 A1 | 3/2009 | Shimasaki et al. |
| 2009/0073957 A1 | 3/2009 | Newland et al. |
| 2009/0079639 A1 | 3/2009 | Hotta et al. |
| 2009/0083562 A1 | 3/2009 | Park et al. |
| 2009/0089600 A1 | 4/2009 | Nousiainen |
| 2009/0090568 A1 | 4/2009 | Min |
| 2009/0102794 A1 | 4/2009 | Lapstun et al. |
| 2009/0117955 A1 | 5/2009 | Lo |
| 2009/0127005 A1 | 5/2009 | Zachut et al. |
| 2009/0135142 A1 | 5/2009 | Fu et al. |
| 2009/0140985 A1 | 6/2009 | Liu |
| 2009/0163147 A1 | 6/2009 | Steigerwald et al. |
| 2009/0167728 A1 | 7/2009 | Geaghan et al. |
| 2009/0174759 A1 | 7/2009 | Yeh et al. |
| 2009/0182901 A1 | 7/2009 | Callaghan et al. |
| 2009/0187879 A1 | 7/2009 | Ao et al. |
| 2009/0189873 A1 | 7/2009 | Peterson et al. |
| 2009/0195497 A1 | 8/2009 | Fitzgerald et al. |
| 2009/0195518 A1 | 8/2009 | Mattice et al. |
| 2009/0201850 A1 | 8/2009 | Davis et al. |
| 2009/0207144 A1 | 8/2009 | Bridger |
| 2009/0217241 A1 | 8/2009 | Motoyama et al. |
| 2009/0219250 A1 | 9/2009 | Ure |
| 2009/0231019 A1 | 9/2009 | Yeh |
| 2009/0231275 A1 | 9/2009 | Odgers |
| 2009/0239586 A1 | 9/2009 | Boeve et al. |
| 2009/0241020 A1 | 9/2009 | Hsiao |
| 2009/0244832 A1 | 10/2009 | Behar et al. |
| 2009/0250366 A1 | 10/2009 | Esfahani |
| 2009/0251008 A1 | 10/2009 | Sugaya |
| 2009/0259865 A1 | 10/2009 | Sheynblat et al. |
| 2009/0262492 A1 | 10/2009 | Whitchurch et al. |
| 2009/0265670 A1 | 10/2009 | Kim et al. |
| 2009/0270138 A1* | 10/2009 | Raveendran ......... H04N 21/443 455/574 |
| 2009/0285491 A1 | 11/2009 | Ravenscroft et al. |
| 2009/0296331 A1 | 12/2009 | Choy |
| 2009/0303137 A1 | 12/2009 | Kusaka et al. |
| 2009/0303204 A1 | 12/2009 | Nasiri et al. |
| 2009/0315830 A1 | 12/2009 | Westerman |
| 2009/0320244 A1 | 12/2009 | Lin |
| 2009/0321490 A1 | 12/2009 | Groene et al. |
| 2010/0001963 A1 | 1/2010 | Doray et al. |
| 2010/0013319 A1 | 1/2010 | Kamiyama et al. |
| 2010/0021022 A1 | 1/2010 | Pittel et al. |
| 2010/0026656 A1 | 2/2010 | Hotelling et al. |
| 2010/0038821 A1 | 2/2010 | Jenkins et al. |
| 2010/0039081 A1 | 2/2010 | Sip |
| 2010/0039764 A1 | 2/2010 | Locker et al. |
| 2010/0045540 A1 | 2/2010 | Lai et al. |
| 2010/0045609 A1 | 2/2010 | Do et al. |
| 2010/0045633 A1 | 2/2010 | Gettemy et al. |
| 2010/0051356 A1 | 3/2010 | Stern et al. |
| 2010/0051432 A1 | 3/2010 | Lin et al. |
| 2010/0052880 A1 | 3/2010 | Laitinen et al. |
| 2010/0053534 A1 | 3/2010 | Hsieh et al. |
| 2010/0055928 A1 | 3/2010 | Randall |
| 2010/0075517 A1 | 3/2010 | Ni et al. |
| 2010/0077237 A1 | 3/2010 | Sawyers |
| 2010/0081377 A1 | 4/2010 | Chatterjee et al. |
| 2010/0085321 A1 | 4/2010 | Pundsack |
| 2010/0102182 A1 | 4/2010 | Lin |
| 2010/0103112 A1 | 4/2010 | Yoo et al. |
| 2010/0103131 A1 | 4/2010 | Segal et al. |
| 2010/0103611 A1 | 4/2010 | Yang et al. |
| 2010/0105443 A1 | 4/2010 | Vaisanen |
| 2010/0123686 A1 | 5/2010 | Klinghult et al. |
| 2010/0133398 A1 | 6/2010 | Chiu et al. |
| 2010/0141588 A1 | 6/2010 | Kimura et al. |
| 2010/0142130 A1 | 6/2010 | Wang et al. |
| 2010/0146308 A1 | 6/2010 | Gioscia et al. |
| 2010/0146488 A1 | 6/2010 | Chen et al. |
| 2010/0148995 A1 | 6/2010 | Elias |
| 2010/0148999 A1 | 6/2010 | Casparian et al. |
| 2010/0149104 A1 | 6/2010 | Sim et al. |
| 2010/0149111 A1 | 6/2010 | Olien |
| 2010/0149134 A1 | 6/2010 | Westerman et al. |
| 2010/0149377 A1 | 6/2010 | Shintani et al. |
| 2010/0154171 A1 | 6/2010 | Lombardi et al. |
| 2010/0156798 A1 | 6/2010 | Archer |
| 2010/0156913 A1 | 6/2010 | Ortega et al. |
| 2010/0161522 A1 | 6/2010 | Tirpak et al. |
| 2010/0162109 A1 | 6/2010 | Chatterjee et al. |
| 2010/0164857 A1 | 7/2010 | Liu et al. |
| 2010/0164897 A1 | 7/2010 | Morin et al. |
| 2010/0171708 A1 | 7/2010 | Chuang |
| 2010/0171891 A1 | 7/2010 | Kaji et al. |
| 2010/0174421 A1 | 7/2010 | Tsai et al. |
| 2010/0180063 A1 | 7/2010 | Ananny et al. |
| 2010/0188299 A1 | 7/2010 | Rinehart et al. |
| 2010/0188338 A1 | 7/2010 | Longe |
| 2010/0205472 A1 | 8/2010 | Tupman et al. |
| 2010/0206614 A1 | 8/2010 | Park et al. |
| 2010/0206644 A1 | 8/2010 | Yeh |
| 2010/0214214 A1 | 8/2010 | Corson et al. |
| 2010/0214257 A1 | 8/2010 | Wussler et al. |
| 2010/0222110 A1 | 9/2010 | Kim et al. |
| 2010/0231498 A1 | 9/2010 | Large et al. |
| 2010/0231510 A1 | 9/2010 | Sampsell et al. |
| 2010/0231556 A1 | 9/2010 | Mines et al. |
| 2010/0235546 A1 | 9/2010 | Terlizzi et al. |
| 2010/0238075 A1 | 9/2010 | Pourseyed |
| 2010/0238119 A1 | 9/2010 | Dubrovsky et al. |
| 2010/0238138 A1 | 9/2010 | Goertz et al. |
| 2010/0238620 A1 | 9/2010 | Fish |
| 2010/0244577 A1 | 9/2010 | Shimokawa |
| 2010/0245221 A1 | 9/2010 | Khan |
| 2010/0250988 A1 | 9/2010 | Okuda et al. |
| 2010/0259482 A1 | 10/2010 | Ball |
| 2010/0265182 A1 | 10/2010 | Ball et al. |

(56) References Cited

U.S. PATENT DOCUMENTS

| | | |
|---|---|---|
| 2010/0271771 A1 | 10/2010 | Wu et al. |
| 2010/0274932 A1 | 10/2010 | Kose |
| 2010/0279768 A1 | 11/2010 | Huang et al. |
| 2010/0289457 A1 | 11/2010 | Onnerud et al. |
| 2010/0295812 A1 | 11/2010 | Burns et al. |
| 2010/0302378 A1 | 12/2010 | Marks et al. |
| 2010/0304793 A1 | 12/2010 | Kim |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0309617 A1 | 12/2010 | Wang et al. |
| 2010/0313680 A1 | 12/2010 | Joung et al. |
| 2010/0315348 A1 | 12/2010 | Jellicoe et al. |
| 2010/0315373 A1 | 12/2010 | Steinhauser et al. |
| 2010/0321299 A1 | 12/2010 | Shelley et al. |
| 2010/0321301 A1 | 12/2010 | Casparian et al. |
| 2010/0321330 A1 | 12/2010 | Lim et al. |
| 2010/0321339 A1 | 12/2010 | Kimmel |
| 2010/0321877 A1 | 12/2010 | Moser |
| 2010/0324457 A1 | 12/2010 | Bean et al. |
| 2010/0325155 A1 | 12/2010 | Skinner et al. |
| 2010/0331059 A1 | 12/2010 | Apgar et al. |
| 2011/0007008 A1 | 1/2011 | Algreatly |
| 2011/0012873 A1 | 1/2011 | Prest et al. |
| 2011/0018556 A1 | 1/2011 | Le et al. |
| 2011/0019123 A1 | 1/2011 | Prest et al. |
| 2011/0031287 A1 | 2/2011 | Le Gette et al. |
| 2011/0032127 A1 | 2/2011 | Roush |
| 2011/0036965 A1 | 2/2011 | Zhang et al. |
| 2011/0037721 A1 | 2/2011 | Cranfill et al. |
| 2011/0043990 A1 | 2/2011 | Mickey et al. |
| 2011/0050576 A1 | 3/2011 | Forutanpour et al. |
| 2011/0050626 A1 | 3/2011 | Porter et al. |
| 2011/0055407 A1 | 3/2011 | Lydon et al. |
| 2011/0057724 A1 | 3/2011 | Pabon |
| 2011/0057899 A1 | 3/2011 | Sleeman et al. |
| 2011/0060926 A1 | 3/2011 | Brooks et al. |
| 2011/0066973 A1 | 3/2011 | Plom et al. |
| 2011/0069148 A1 | 3/2011 | Jones et al. |
| 2011/0074688 A1 | 3/2011 | Hull et al. |
| 2011/0083126 A1 | 4/2011 | Bhakta et al. |
| 2011/0093773 A1 | 4/2011 | Yee |
| 2011/0095994 A1 | 4/2011 | Birnbaum |
| 2011/0096513 A1 | 4/2011 | Kim |
| 2011/0102326 A1 | 5/2011 | Casparian et al. |
| 2011/0102356 A1 | 5/2011 | Kemppinen et al. |
| 2011/0115712 A1 | 5/2011 | Han et al. |
| 2011/0115738 A1 | 5/2011 | Suzuki et al. |
| 2011/0115747 A1 | 5/2011 | Powell et al. |
| 2011/0117970 A1 | 5/2011 | Choi |
| 2011/0118025 A1 | 5/2011 | Lukas et al. |
| 2011/0134032 A1 | 6/2011 | Chiu et al. |
| 2011/0134112 A1 | 6/2011 | Koh et al. |
| 2011/0147398 A1 | 6/2011 | Ahee et al. |
| 2011/0148793 A1 | 6/2011 | Ciesla et al. |
| 2011/0157046 A1 | 6/2011 | Lee et al. |
| 2011/0157087 A1 | 6/2011 | Kanehira et al. |
| 2011/0163955 A1 | 7/2011 | Nasiri et al. |
| 2011/0164370 A1 | 7/2011 | McClure et al. |
| 2011/0164813 A1 | 7/2011 | Enomoto |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0167992 A1 | 7/2011 | Eventoff et al. |
| 2011/0169762 A1 | 7/2011 | Weiss |
| 2011/0170289 A1 | 7/2011 | Allen et al. |
| 2011/0176035 A1 | 7/2011 | Poulsen |
| 2011/0179864 A1 | 7/2011 | Raasch et al. |
| 2011/0183678 A1 | 7/2011 | Kerpez et al. |
| 2011/0184646 A1 | 7/2011 | Wong et al. |
| 2011/0184824 A1 | 7/2011 | George et al. |
| 2011/0188199 A1 | 8/2011 | Pan |
| 2011/0193787 A1 | 8/2011 | Morishige et al. |
| 2011/0193938 A1 | 8/2011 | Oderwald et al. |
| 2011/0202878 A1 | 8/2011 | Park et al. |
| 2011/0205372 A1 | 8/2011 | Miramontes |
| 2011/0216266 A1 | 9/2011 | Travis |
| 2011/0225490 A1 | 9/2011 | Meunier |
| 2011/0227913 A1 | 9/2011 | Hyndman |
| 2011/0231682 A1 | 9/2011 | Kakish et al. |
| 2011/0234502 A1 | 9/2011 | Yun et al. |
| 2011/0242138 A1 | 10/2011 | Tribble |
| 2011/0248152 A1 | 10/2011 | Svajda et al. |
| 2011/0248920 A1 | 10/2011 | Larsen |
| 2011/0248941 A1 | 10/2011 | Abdo et al. |
| 2011/0261001 A1 | 10/2011 | Liu |
| 2011/0261083 A1 | 10/2011 | Wilson |
| 2011/0266672 A1 | 11/2011 | Sylvester |
| 2011/0267272 A1 | 11/2011 | Meyer et al. |
| 2011/0267300 A1 | 11/2011 | Serban et al. |
| 2011/0267757 A1 | 11/2011 | Probst |
| 2011/0273475 A1 | 11/2011 | Herz et al. |
| 2011/0290686 A1 | 12/2011 | Huang |
| 2011/0295697 A1 | 12/2011 | Boston et al. |
| 2011/0297566 A1 | 12/2011 | Gallagher et al. |
| 2011/0298919 A1 | 12/2011 | Maglaque |
| 2011/0302518 A1 | 12/2011 | Zhang |
| 2011/0304577 A1 | 12/2011 | Brown et al. |
| 2011/0304962 A1 | 12/2011 | Su |
| 2011/0305875 A1 | 12/2011 | Sanford et al. |
| 2011/0306424 A1 | 12/2011 | Kazama et al. |
| 2011/0310038 A1 | 12/2011 | Park et al. |
| 2011/0316807 A1 | 12/2011 | Corrion |
| 2011/0317399 A1 | 12/2011 | Hsu |
| 2012/0007821 A1 | 1/2012 | Zaliva |
| 2012/0011462 A1 | 1/2012 | Westerman et al. |
| 2012/0013519 A1 | 1/2012 | Hakansson et al. |
| 2012/0023459 A1 | 1/2012 | Westerman |
| 2012/0024682 A1 | 2/2012 | Huang et al. |
| 2012/0026048 A1 | 2/2012 | Vazquez et al. |
| 2012/0026096 A1 | 2/2012 | Ku |
| 2012/0032887 A1 | 2/2012 | Chiu et al. |
| 2012/0032891 A1 | 2/2012 | Parivar |
| 2012/0038495 A1 | 2/2012 | Ishikawa |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0068919 A1 | 3/2012 | Lauder et al. |
| 2012/0069540 A1 | 3/2012 | Lauder et al. |
| 2012/0071189 A1 | 3/2012 | Mody |
| 2012/0072167 A1 | 3/2012 | Cretella, Jr. et al. |
| 2012/0075249 A1 | 3/2012 | Hoch |
| 2012/0077384 A1 | 3/2012 | Bar-Niv et al. |
| 2012/0081316 A1 | 4/2012 | Sirpal et al. |
| 2012/0084345 A1 | 4/2012 | Silbey et al. |
| 2012/0087078 A1 | 4/2012 | Medica et al. |
| 2012/0092279 A1 | 4/2012 | Martin |
| 2012/0094257 A1 | 4/2012 | Pillischer et al. |
| 2012/0098751 A1 | 4/2012 | Liu |
| 2012/0099263 A1 | 4/2012 | Lin |
| 2012/0099749 A1 | 4/2012 | Rubin et al. |
| 2012/0106082 A1 | 5/2012 | Wu et al. |
| 2012/0108180 A1 | 5/2012 | Shibuya |
| 2012/0113579 A1 | 5/2012 | Agata et al. |
| 2012/0115553 A1 | 5/2012 | Mahe et al. |
| 2012/0117409 A1 | 5/2012 | Lee et al. |
| 2012/0127118 A1 | 5/2012 | Nolting et al. |
| 2012/0133561 A1 | 5/2012 | Konanur et al. |
| 2012/0140396 A1 | 6/2012 | Zeliff et al. |
| 2012/0145525 A1 | 6/2012 | Ishikawa |
| 2012/0155015 A1 | 6/2012 | Govindasamy et al. |
| 2012/0161406 A1 | 6/2012 | Mersky |
| 2012/0162693 A1 | 6/2012 | Ito |
| 2012/0170966 A1 | 7/2012 | Novak, Jr. |
| 2012/0173226 A1 | 7/2012 | McEvoy et al. |
| 2012/0174224 A1 | 7/2012 | Thomas et al. |
| 2012/0175487 A1 | 7/2012 | Goto |
| 2012/0180002 A1 | 7/2012 | Campbell et al. |
| 2012/0182242 A1 | 7/2012 | Lindahl et al. |
| 2012/0182249 A1 | 7/2012 | Endo et al. |
| 2012/0182743 A1 | 7/2012 | Chou |
| 2012/0189203 A1 | 7/2012 | Lin et al. |
| 2012/0192155 A1 | 7/2012 | Silbey et al. |
| 2012/0194393 A1 | 8/2012 | Utterman et al. |

(56) References Cited

U.S. PATENT DOCUMENTS

| | | |
|---|---|---|
| 2012/0194448 A1 | 8/2012 | Rothkopf |
| 2012/0195063 A1 | 8/2012 | Kim et al. |
| 2012/0200532 A1 | 8/2012 | Powell et al. |
| 2012/0200802 A1 | 8/2012 | Large |
| 2012/0206937 A1 | 8/2012 | Travis et al. |
| 2012/0212438 A1 | 8/2012 | Vaisanen |
| 2012/0223866 A1 | 9/2012 | Ayala Vazquez et al. |
| 2012/0224073 A1 | 9/2012 | Miyahara |
| 2012/0229634 A1 | 9/2012 | Laett et al. |
| 2012/0235635 A1 | 9/2012 | Sato |
| 2012/0235921 A1 | 9/2012 | Laubach |
| 2012/0243204 A1 | 9/2012 | Robinson |
| 2012/0246377 A1 | 9/2012 | Bhesania |
| 2012/0249300 A1 | 10/2012 | Avital et al. |
| 2012/0249443 A1 | 10/2012 | Anderson et al. |
| 2012/0256959 A1 | 10/2012 | Ye et al. |
| 2012/0263118 A1 | 10/2012 | Love et al. |
| 2012/0268911 A1 | 10/2012 | Lin |
| 2012/0268912 A1 | 10/2012 | Minami et al. |
| 2012/0270537 A1 | 10/2012 | Weng et al. |
| 2012/0274811 A1 | 11/2012 | Bakin |
| 2012/0287562 A1 | 11/2012 | Wu et al. |
| 2012/0299872 A1 | 11/2012 | Nishikawa et al. |
| 2012/0300275 A1 | 11/2012 | Vilardell et al. |
| 2012/0312955 A1 | 12/2012 | Randolph |
| 2012/0326003 A1 | 12/2012 | Solow et al. |
| 2012/0328349 A1 | 12/2012 | Isaac et al. |
| 2013/0009413 A1 | 1/2013 | Chiu et al. |
| 2013/0027867 A1 | 1/2013 | Lauder et al. |
| 2013/0044074 A1 | 2/2013 | Park et al. |
| 2013/0047008 A1* | 2/2013 | Shin .................. G06F 1/26 713/310 |
| 2013/0047747 A1 | 2/2013 | Joung, II |
| 2013/0050922 A1 | 2/2013 | Lee et al. |
| 2013/0063873 A1 | 3/2013 | Wodrich et al. |
| 2013/0067126 A1 | 3/2013 | Casparian et al. |
| 2013/0073877 A1 | 3/2013 | Radke |
| 2013/0076617 A1 | 3/2013 | Csaszar et al. |
| 2013/0088431 A1 | 4/2013 | Ballagas et al. |
| 2013/0088442 A1 | 4/2013 | Lee |
| 2013/0093388 A1 | 4/2013 | Partovi |
| 2013/0094131 A1 | 4/2013 | O'Donnell et al. |
| 2013/0097534 A1 | 4/2013 | Lewin et al. |
| 2013/0106723 A1 | 5/2013 | Bakken et al. |
| 2013/0106766 A1 | 5/2013 | Yilmaz et al. |
| 2013/0107144 A1 | 5/2013 | Marhefka |
| 2013/0107572 A1 | 5/2013 | Holman et al. |
| 2013/0141370 A1 | 6/2013 | Wang et al. |
| 2013/0162554 A1 | 6/2013 | Lauder et al. |
| 2013/0167663 A1 | 7/2013 | Eventoff |
| 2013/0172906 A1 | 7/2013 | Olson et al. |
| 2013/0179798 A1 | 7/2013 | Korupolu |
| 2013/0191715 A1 | 7/2013 | Raskovic et al. |
| 2013/0194235 A1 | 8/2013 | Zanone et al. |
| 2013/0207937 A1 | 8/2013 | Lutian et al. |
| 2013/0217451 A1 | 8/2013 | Komiyama et al. |
| 2013/0227836 A1 | 9/2013 | Whitt, III et al. |
| 2013/0228023 A1 | 9/2013 | Drasnin |
| 2013/0228433 A1 | 9/2013 | Shaw |
| 2013/0228434 A1 | 9/2013 | Whitt, III |
| 2013/0228435 A1 | 9/2013 | Whitt, III |
| 2013/0228439 A1 | 9/2013 | Whitt, III |
| 2013/0229100 A1 | 9/2013 | Siddiqui et al. |
| 2013/0229273 A1 | 9/2013 | Nodar Cortizo et al. |
| 2013/0229335 A1 | 9/2013 | Whitman |
| 2013/0229347 A1 | 9/2013 | Lutz, III |
| 2013/0229350 A1 | 9/2013 | Shaw et al. |
| 2013/0229351 A1 | 9/2013 | Whitt, III |
| 2013/0229354 A1 | 9/2013 | Whitt, III et al. |
| 2013/0229356 A1 | 9/2013 | Marwah |
| 2013/0229363 A1 | 9/2013 | Whitman |
| 2013/0229366 A1 | 9/2013 | Dighde |
| 2013/0229380 A1 | 9/2013 | Lutz, III |
| 2013/0229386 A1 | 9/2013 | Bathiche |
| 2013/0229534 A1 | 9/2013 | Panay |
| 2013/0229568 A1 | 9/2013 | Belesiu et al. |
| 2013/0229570 A1 | 9/2013 | Beck et al. |
| 2013/0229756 A1 | 9/2013 | Whitt, III |
| 2013/0229757 A1 | 9/2013 | Whitt, III et al. |
| 2013/0229758 A1 | 9/2013 | Belesiu et al. |
| 2013/0229759 A1 | 9/2013 | Whitt, III et al. |
| 2013/0229760 A1 | 9/2013 | Whitt, III |
| 2013/0229761 A1 | 9/2013 | Shaw |
| 2013/0229762 A1 | 9/2013 | Whitt, III |
| 2013/0229773 A1 | 9/2013 | Siddiqui et al. |
| 2013/0230346 A1 | 9/2013 | Shaw |
| 2013/0231755 A1 | 9/2013 | Perek |
| 2013/0232280 A1 | 9/2013 | Perek |
| 2013/0232348 A1 | 9/2013 | Oler |
| 2013/0232349 A1 | 9/2013 | Oler et al. |
| 2013/0232350 A1 | 9/2013 | Belesiu et al. |
| 2013/0232353 A1 | 9/2013 | Belesiu |
| 2013/0232571 A1 | 9/2013 | Belesiu |
| 2013/0242762 A1 | 9/2013 | Bennett et al. |
| 2013/0262886 A1 | 10/2013 | Nishimura |
| 2013/0278552 A1 | 10/2013 | Kamin-Lyndgaard |
| 2013/0279098 A1 | 10/2013 | Cho |
| 2013/0288516 A1 | 10/2013 | Chang et al. |
| 2013/0300590 A1 | 11/2013 | Dietz |
| 2013/0300647 A1 | 11/2013 | Drasnin |
| 2013/0301199 A1 | 11/2013 | Whitt |
| 2013/0301200 A1 | 11/2013 | Leung |
| 2013/0301206 A1 | 11/2013 | Whitt |
| 2013/0304941 A1 | 11/2013 | Drasnin |
| 2013/0304944 A1 | 11/2013 | Young |
| 2013/0322000 A1 | 12/2013 | Whitt |
| 2013/0322001 A1 | 12/2013 | Whitt |
| 2013/0322423 A1 | 12/2013 | Park et al. |
| 2013/0329360 A1 | 12/2013 | Aldana |
| 2013/0332628 A1 | 12/2013 | Panay |
| 2013/0335330 A1 | 12/2013 | Lane |
| 2013/0335902 A1 | 12/2013 | Campbell |
| 2013/0335903 A1 | 12/2013 | Raken |
| 2013/0339757 A1 | 12/2013 | Reddy |
| 2013/0342464 A1 | 12/2013 | Bathiche et al. |
| 2013/0342465 A1 | 12/2013 | Bathiche |
| 2013/0346636 A1 | 12/2013 | Bathiche |
| 2014/0012401 A1 | 1/2014 | Perek et al. |
| 2014/0020484 A1 | 1/2014 | Shaw et al. |
| 2014/0022177 A1 | 1/2014 | Shaw |
| 2014/0028635 A1 | 1/2014 | Krah |
| 2014/0029183 A1* | 1/2014 | Ashcraft .................. G06F 1/26 361/679.4 |
| 2014/0036430 A1 | 2/2014 | Wroblewski et al. |
| 2014/0043275 A1 | 2/2014 | Whitman |
| 2014/0048399 A1 | 2/2014 | Whitt, III |
| 2014/0049894 A1 | 2/2014 | Rihn |
| 2014/0061406 A1 | 3/2014 | Chevalier et al. |
| 2014/0080501 A1 | 3/2014 | Lee et al. |
| 2014/0094165 A1 | 4/2014 | Karlsson et al. |
| 2014/0098485 A1 | 4/2014 | Vahid |
| 2014/0104279 A1 | 4/2014 | Albrecht |
| 2014/0117928 A1 | 5/2014 | Liao |
| 2014/0118241 A1 | 5/2014 | Chai |
| 2014/0119802 A1 | 5/2014 | Shaw |
| 2014/0128091 A1 | 5/2014 | Engström |
| 2014/0131000 A1 | 5/2014 | Bornemann et al. |
| 2014/0135060 A1 | 5/2014 | Mercer |
| 2014/0148938 A1 | 5/2014 | Zhang |
| 2014/0154523 A1 | 6/2014 | Bornemann |
| 2014/0166227 A1 | 6/2014 | Bornemann |
| 2014/0173402 A1 | 6/2014 | Bastide et al. |
| 2014/0173517 A1 | 6/2014 | Chaudhri |
| 2014/0185215 A1 | 7/2014 | Whitt et al. |
| 2014/0185220 A1 | 7/2014 | Whitt et al. |
| 2014/0187288 A1 | 7/2014 | Correll, Jr. |
| 2014/0204514 A1 | 7/2014 | Whitt |
| 2014/0204515 A1 | 7/2014 | Whitt |
| 2014/0221098 A1 | 8/2014 | Boulanger |
| 2014/0233237 A1 | 8/2014 | Lutian |
| 2014/0247546 A1 | 9/2014 | Whitt |
| 2014/0248506 A1 | 9/2014 | McCormack |
| 2014/0328194 A1 | 11/2014 | Sen et al. |
| 2014/0341056 A1 | 11/2014 | Carbajal |

(56) References Cited

U.S. PATENT DOCUMENTS

| | | |
|---|---|---|
| 2015/0085683 A1 | 3/2015 | Sadek et al. |
| 2015/0241929 A1 | 8/2015 | Raken et al. |
| 2015/0246614 A1 | 9/2015 | Dames et al. |
| 2015/0277500 A1 | 10/2015 | Turowski et al. |
| 2015/0310043 A1 | 10/2015 | Adelman |
| 2016/0034001 A1 | 2/2016 | Huston et al. |
| 2016/0042070 A1 | 2/2016 | Rossi et al. |
| 2016/0050529 A1 | 2/2016 | Hassan et al. |
| 2016/0055374 A1 | 2/2016 | Zhang et al. |
| 2016/0055659 A1 | 2/2016 | Wilson et al. |
| 2016/0056916 A1 | 2/2016 | Hassan et al. |
| 2016/0065265 A1 | 3/2016 | Hassan et al. |
| 2016/0073267 A1 | 3/2016 | Hassan et al. |
| 2016/0077843 A1 | 3/2016 | Jakoboski et al. |
| 2017/0248999 A1 | 8/2017 | Ng et al. |
| 2018/0212467 A1 | 7/2018 | Jung et al. |

FOREIGN PATENT DOCUMENTS

| | | |
|---|---|---|
| CN | 1825278 | 8/2006 |
| CN | 101388057 | 3/2009 |
| CN | 101650659 | 2/2010 |
| CN | 101685487 | 3/2010 |
| CN | 101799855 | 8/2010 |
| CN | 202441167 | 9/2012 |
| CN | 102855232 | 1/2013 |
| CN | 103455149 | 12/2013 |
| DE | 202011103087 | 8/2011 |
| EP | 0271956 | 6/1988 |
| EP | 0611498 | 8/1994 |
| EP | 1223722 | 7/2002 |
| EP | 1480029 | 11/2004 |
| EP | 1591891 | 11/2005 |
| EP | 2026178 | 2/2009 |
| EP | 2353978 | 8/2011 |
| EP | 2378607 | 10/2011 |
| EP | 2584432 | 4/2013 |
| GB | 2102632 | 2/1983 |
| GB | 2123213 | 1/1984 |
| GB | 2178570 | 2/1987 |
| JP | 56108127 | 8/1981 |
| JP | 10326124 | 12/1998 |
| JP | 1173239 | 3/1999 |
| JP | 11338575 | 12/1999 |
| JP | 11345041 | 12/1999 |
| JP | 2000010654 | 1/2000 |
| JP | 2001142564 | 5/2001 |
| JP | 2004038950 | 2/2004 |
| JP | 2006163459 | 6/2006 |
| JP | 2006294361 | 10/2006 |
| JP | 2010244514 | 10/2010 |
| KR | 20010107055 | 12/2001 |
| KR | 20030000579 | 1/2003 |
| KR | 20050014299 | 2/2005 |
| KR | 20060003093 | 1/2006 |
| KR | 20080006404 | 1/2008 |
| KR | 20090029411 | 3/2009 |
| KR | 20100022059 | 2/2010 |
| KR | 20100067366 | 6/2010 |
| KR | 20100115675 | 10/2010 |
| KR | 1020110087178 | 8/2011 |
| KR | 20110109791 | 10/2011 |
| KR | 20110120002 | 11/2011 |
| KR | 20110122333 | 11/2011 |
| KR | 101113530 | 2/2012 |
| NL | 1038411 | 5/2012 |
| TW | M482205 | 7/2014 |
| WO | WO 2001058098 | 8/2001 |
| WO | WO 02069533 | 9/2002 |
| WO | WO 2006044818 | 4/2006 |
| WO | WO 2007112172 | 10/2007 |
| WO | WO 2008055039 | 5/2008 |
| WO | WO 2009034484 | 3/2009 |
| WO | WO 2009139789 | 11/2009 |
| WO | WO 2010011983 | 1/2010 |
| WO | WO 2010048746 | 5/2010 |
| WO | WO 2010105272 | 9/2010 |
| WO | WO 2011049609 | 4/2011 |
| WO | WO 2012036717 | 3/2012 |
| WO | WO 2012171729 | 12/2012 |
| WO | WO 2013010323 | 1/2013 |

OTHER PUBLICATIONS

"Final Office Action", U.S. Appl. No. 14/229,507, dated Jan. 25, 2017, 21 pages.
"Non-Final Office Action", U.S. Appl. No. 14/229,507, dated Jul. 29, 2016, 24 pages.
"Corrected Notice of Allowance", U.S. Appl. No. 14/486,381, dated Jul. 20, 2016, 4 pages.
"International Preliminary Report on Patentability", Application No. PCT/US2015/049270, dated Jul. 6, 2016, 5 pages.
"Notice of Allowance", U.S. Appl. No. 14/450,023, dated Aug. 24, 2016, 5 pages.
"ABBYY FineReader", Available at: http://www.softexia.com/office-tools/abbyy-finereader/, Jul. 11, 2013, 10 pages.
"Accessing Device Sensors", retrieved from <https://developer.palm.com/content/api/dev-guide/pdk/accessing-device-sensors.html> on May 25, 2012, 2011, 4 pages.
"ACPI Docking for Windows Operating Systems", Retrieved from: <http://www.scritube.com/limba/engleza/software/ACPI-Docking-for-Windows-Opera331824193.php> on Jul. 6, 2012, 2012, 10 pages.
"Advanced Configuration and Power Management Specification", Intel Corporation, Microsoft Corporation, Toshiba Corp. Revision 1, Dec. 22, 1996, 364 pages.
"Advisory Action", U.S. Appl. No. 13/939,032, dated Feb. 24, 2014, 2 pages.
"Advisory Action", U.S. Appl. No. 14/199,924, dated May 28, 2014, 2 pages.
"Basic Cam Motion Curves", Retrieved From: <http://ocw.metu.edu.tr/pluginfile.php/6886/mod_resource/content/1/ch8/8-3.htm> Nov. 22, 2013, Middle East Technical University, 1999, 14 Pages.
"Cholesteric Liquid Crystal", Retrieved from: <http://en.wikipedia.org/wiki/Cholesteric_liquid_crystal> on Aug. 6, 2012, Jun. 10, 2012, 2 pages.
"Chronoscan", Available at: http://www.chronoscan.org/index.php?lang=en, Jan. 26, 2013, 3 pages.
"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, Jan. 2013, 1 page.
"Corrected Notice of Allowance", U.S. Appl. No. 13/470,633, dated Apr. 9, 2013, 2 pages.
"Corrected Notice of Allowance", U.S. Appl. No. 13/470,633, dated Jul. 2, 2013, 2 pages.
"Corrected Notice of Allowance", U.S. Appl. No. 13/471,030, dated Sep. 30, 2014, 2 pages.
"Corrected Notice of Allowance", U.S. Appl. No. 13/563,435, dated Jan. 14, 2014, 2 pages.
"Corrected Notice of Allowance", U.S. Appl. No. 13/563,435, dated Mar. 20, 2014, 2 pages.
"Corrected Notice of Allowance", U.S. Appl. No. 13/563,435, dated Jan. 22, 2014, 2 pages.
"Corrected Notice of Allowance", U.S. Appl. No. 13/565,124, dated Apr. 3, 2014, 4 pages.
"Corrected Notice of Allowance", U.S. Appl. No. 13/565,124, dated Mar. 10, 2014, 2 pages.
"Corrected Notice of Allowance", U.S. Appl. No. 13/565,124, dated Apr. 14, 2014, 2 pages.
"Corrected Notice of Allowance", U.S. Appl. No. 13/603,918, dated May 8, 2015, 2 pages.
"Corrected Notice of Allowance", U.S. Appl. No. 13/651,232, dated Jul. 31, 2014, 2 pages.
"Corrected Notice of Allowance", U.S. Appl. No. 13/651,287, dated Aug. 21, 2014, 2 pages.
"Corrected Notice of Allowance", U.S. Appl. No. 13/651,327, dated Sep. 12, 2013, 2 pages.

(56) References Cited

OTHER PUBLICATIONS

"Corrected Notice of Allowance", U.S. Appl. No. 13/651,327, dated Sep. 23, 2013, 2 pages.
"Corrected Notice of Allowance", U.S. Appl. No. 13/651,726, dated Sep. 17, 2013, 2 pages.
"Corrected Notice of Allowance", U.S. Appl. No. 13/656,520, dated Jan. 16, 2014, 3 pages.
"Corrected Notice of Allowance", U.S. Appl. No. 13/715,133, dated Apr. 2, 2014, 2 pages.
"Corrected Notice of Allowance", U.S. Appl. No. 13/938,930, dated May 6, 2014, 2 pages.
"Corrected Notice of Allowance", U.S. Appl. No. 13/938,930, dated Jun. 6, 2014, 2 pages.
"Corrected Notice of Allowance", U.S. Appl. No. 13/939,002, dated May 22, 2014, 2 pages.
"Corrected Notice of Allowance", U.S. Appl. No. 13/939,002, dated Jun. 19, 2014, 2 pages.
"Corrected Notice of Allowance", U.S. Appl. No. 13/939,002, dated May 5, 2014, 2 pages.
"Corrected Notice of Allowance", U.S. Appl. No. 13/939,032, dated Jun. 26, 2014, 2 pages.
"Corrected Notice of Allowance", U.S. Appl. No. 13/939,032, dated Jul. 15, 2014, 2 pages.
"Corrected Notice of Allowance", U.S. Appl. No. 14/199,924, dated Aug. 29, 2014, 2 pages.
"Corrected Notice of Allowance", U.S. Appl. No. 14/199,924, dated Sep. 5, 2014, 2 pages.
"Corrected Notice of Allowance", U.S. Appl. No. 14/199,924, dated Sep. 19, 2014, 2 pages.
"Corrected Notice of Allowance", U.S. Appl. No. 14/486,381, dated May 24, 2016, 6 pages.
"Developing Next-Generation Human Interfaces using Capacitive and Infrared Proximity Sensing", Silicon Laboratories, Inc., Available at <http://www.silabs.com/pages/DownloadDoc.aspx?FILEURL=support%20documents/technicaldocs/capacitive%20and%20proximity%20sensing_wp.pdf&src=SearchResults>, Aug. 30, 2010, pp. 1-10.
"Directional Backlighting for Display Panels", U.S. Appl. No. 13/021,448, filed Feb. 24, 2011, 38 pages.
"DR2PA", retrieved from <http://www.architainment.co.uk/wp-content/uploads/2012/08/DR2PA-AU-US-size-Data-Sheet-Rev-H_LOGO.pdf> on Sep. 17, 2012, Jan. 2012, 4 pages.
"Ex Parte Quayle Action", U.S. Appl. No. 13/599,763, Nov. 14, 2014, 6 pages.
"Final Office Action", U.S. Appl. No. 12/897,947, dated Dec. 19, 2012, 8 pages.
"Final Office Action", U.S. Appl. No. 13/010,552, dated Sep. 26, 2013, 22 pages.
"Final Office Action", U.S. Appl. No. 13/010,552, dated Oct. 9, 2015, 30 pages.
"Final Office Action", U.S. Appl. No. 13/010,552, dated Oct. 23, 2014, 22 pages.
"Final Office Action", U.S. Appl. No. 13/371,725, dated Apr. 2, 2014, 22 pages.
"Final Office Action", U.S. Appl. No. 13/471,001, dated Jul. 25, 2013, 20 pages.
"Final Office Action", U.S. Appl. No. 13/471,139, dated Sep. 16, 2013, 13 pages.
"Final Office Action", U.S. Appl. No. 13/471,336, dated Aug. 28, 2013, 18 pages.
"Final Office Action", U.S. Appl. No. 13/471,336, dated Oct. 6, 2014, 13 pages.
"Final Office Action", U.S. Appl. No. 13/471,376, dated Aug. 18, 2014, 24 pages.
"Final Office Action", U.S. Appl. No. 13/564,520, dated Jan. 15, 2014, 7 pages.
"Final Office Action", U.S. Appl. No. 13/595,700, dated Aug. 15, 2014, 6 pages.
"Final Office Action", U.S. Appl. No. 13/595,700, dated Oct. 9, 2014, 8 pages.
"Final Office Action", U.S. Appl. No. 13/599,635, dated Aug. 8, 2014, 16 pages.
"Final Office Action", U.S. Appl. No. 13/603,918, dated Mar. 21, 2014, 14 pages.
"Final Office Action", U.S. Appl. No. 13/647,479, dated Sep. 17, 2015, 11 pages.
"Final Office Action", U.S. Appl. No. 13/647,479, dated Dec. 12, 2014, 12 pages.
"Final Office Action", U.S. Appl. No. 13/651,195, dated Apr. 18, 2013, 13 pages.
"Final Office Action", U.S. Appl. No. 13/651,232, dated May 21, 2013, 21 pages.
"Final Office Action", U.S. Appl. No. 13/651,287, dated May 3, 2013, 16 pages.
"Final Office Action", U.S. Appl. No. 13/651,976, dated Jul. 25, 2013, 21 pages.
"Final Office Action", U.S. Appl. No. 13/653,321, dated Aug. 2, 2013, 17 pages.
"Final Office Action", U.S. Appl. No. 13/653,682, dated Jun. 11, 2014, 11 pages.
"Final Office Action", U.S. Appl. No. 13/653,682, dated Oct. 18, 2013, 16 pages.
"Final Office Action", U.S. Appl. No. 13/655,065, dated Apr. 2, 2015, 23 pages.
"Final Office Action", U.S. Appl. No. 13/655,065, dated Aug. 8, 2014, 20 pages.
"Final Office Action", U.S. Appl. No. 13/655,065, dated Nov. 17, 2015, 25 pages.
"Final Office Action", U.S. Appl. No. 13/656,055, dated Sep. 17, 2014, 10 pages.
"Final Office Action", U.S. Appl. No. 13/656,055, dated Oct. 23, 2013, 14 pages.
"Final Office Action", U.S. Appl. No. 13/780,228, dated Mar. 28, 2014, 13 pages.
"Final Office Action", U.S. Appl. No. 13/938,930, dated Nov. 8, 2013, 10 pages.
"Final Office Action", U.S. Appl. No. 13/939,002, dated Nov. 8, 2013, 7 pages.
"Final Office Action", U.S. Appl. No. 13/939,032, dated Dec. 20, 2013, 5 pages.
"Final Office Action", U.S. Appl. No. 13/974,749, dated Sep. 5, 2014, 18 pages.
"Final Office Action", U.S. Appl. No. 13/974,994, dated Oct. 6, 2014, 26 pages.
"Final Office Action", U.S. Appl. No. 13/975,087, dated Sep. 10, 2014, 19 pages.
"Final Office Action", U.S. Appl. No. 14/033,510, dated Aug. 21, 2014, 18 pages.
"Final Office Action", U.S. Appl. No. 14/063,912, dated Apr. 29, 2014, 10 pages.
"Final Office Action", U.S. Appl. No. 14/199,924, dated May 6, 2014, 5 pages.
"Final Office Action", U.S. Appl. No. 14/229,507, dated Apr. 26, 2016, 15 pages.
"Final Office Action", U.S. Appl. No. 14/450,023, dated Feb. 2, 2016, 25 pages.
"Final Office Action", U.S. Appl. No. 14/462,280, dated May 20, 2016, 34 pages.
"Final Office Action", U.S. Appl. No. 14/477,014, dated Jun. 8, 2016, 20 pages.
"Final Office Action", U.S. Appl. No. 14/697,501, dated Apr. 18, 2016, 14 pages.
"FingerWorks Installation and Operation Guide for the TouchStream ST and TouchStream LP", FingerWorks, Inc. Retrieved from <http://ec1.images-amazon.com/media/i3d/01/A/man-migrate/MANUAL000049862.pdf>, 2002, 14 pages.
"First One Handed Fabric Keyboard with Bluetooth Wireless Technology", Retrieved from: <http://press.xtvworld.com/article3817.html> on May 8, 2012, Jan. 6, 2005, 2 pages.
"FOLDOC: Free On-Line Dictionary of Computing, definition for "Exception"", Retrieved from the Internet: http://web.archive.org/web/20100615211114/http://foldoc.org/exception, 1 page.

(56) References Cited

OTHER PUBLICATIONS

"Force and Position Sensing Resistors: An Emerging Technology", Interlink Electronics, Available at <http://staff.science.uva.nl/~vlaander/docu/FSR/An_Exploring_Technology.pdf>, Feb. 1990, pp. 1-6.
"Foreign Notice of Allowance", CN Application No. 201210018531.4, dated Feb. 4, 2016, 7 pages.
"Foreign Notice of Allowance", CN Application No. 201320096755.7, dated Jan. 27, 2014, 2 pages.
"Foreign Notice of Allowance", CN Application No. 201320097065.3, dated Nov. 21, 2013, 2 pages.
"Foreign Office Action", CN Application No. 201210018531.4, dated Feb. 28, 2015, 12 pages.
"Foreign Office Action", CN Application No. 201210018531.4, dated Jun. 4, 2014, 16 pages.
"Foreign Office Action", CN Application No. 201210018531.4, dated Sep. 6, 2015, 13 pages.
"Foreign Office Action", CN Application No. 201320097065.3, dated Jun. 18, 2013, 2 pages.
"Foreign Office Action", CN Application No. 201320097066.8, dated Oct. 24, 2013, 5 Pages.
"Foreign Office Action", CN Application No. 201320097079.5, dated Sep. 26, 2013, 4 pages.
"Foreign Office Action", CN Application No. 201320328022.1, dated Feb. 17, 2014, 4 Pages.
"Foreign Office Action", CN Application No. 201320328022.1, dated Oct. 18, 2013, 3 Pages.
"Frogpad Introduces Weareable Fabric Keyboard with Bluetooth Technology", Retrieved from: <http://www.geekzone.co.nz/content.asp?contentid=3898> on May 7, 2012, Jan. 7, 2005, 3 pages.
"How and Why Would Anyone Validate Their Code", Retrieved from: <http://designreviver.com/articles/how-and-why-would-anyone-validate-their-code/> on Nov. 11, 2010, Aug. 25, 2010, 9 pages.
"How to Use the iPad's Onscreen Keyboard", Retrieved from <http://www.dummies.com/how-to/content/how-to-use-the-ipads-onscreen-keyboard.html> on Aug. 28, 2012, 2012, 3 pages.
"HP Code Advisor Version C.02.15 User's Guide", Hewlett-Packard Development Company L.P., Available at <http://docs.hp.com/en/14242/Cadvise_UG.pdf>, Jan. 2010, pp. 1-72.
"iControlPad 2—The open source controller", Retrieved from <http://www.kickstarter.com/projects/1703567677/icontrolpad-2-the-open-sou rce-controller> on Nov. 20, 2012, 2012, 15 pages.
"i-Interactor electronic pen", Retrieved from: <http://www.alibaba.com/product-gs/331004878/i_Interactor_electronic_pen.html> on Jun. 19, 2012, 2012, 5 pages.
"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 2012, 4 pages.
"Interlink Electronics FSR (TM) Force Sensing Resistors (TM)", Retrieved at <<http://akizukidenshi.com/download/ds/ interlinkelec/94-00004+Rev+B%20FSR%20Integration%20Guide.pdf on Mar. 21, 2013, 36 pages.
"International Preliminary Report on Patentability", Application No. PCT/US2015/022349, dated Apr. 21, 2016, 6 pages.
"International Search Report and Written Opinion", Application No. PCT/US2014/031531, dated Jun. 20, 2014, 10 Pages.
"International Search Report and Written Opinion", Application No. PCT/US2013/028483, dated Jun. 24, 2014, 10 pages.
"International Search Report and Written Opinion", Application No. PCT/US2013/028484, dated Jun. 24, 2014, 10 pages.
"International Search Report and Written Opinion", Application No. PCT/US2013/028485, dated Jun. 25, 2014, 10 pages.
"International Search Report and Written Opinion", Application No. PCT/US2013/028769, dated Jun. 26, 2014, 10 pages.
"International Search Report and Written Opinion", Application No. PCT/US2014/043546, dated Oct. 9, 2014, 10 pages.
"International Search Report and Written Opinion", Application No. PCT/US2015/045985, dated Oct. 30, 2015, 10 Pages.
"International Search Report and Written Opinion", Application No. PCT/US2015/044402, dated Nov. 9, 2015, 10 pages.
"International Search Report and Written Opinion", Application No. PCT/US2013/065154, dated Feb. 5, 2014, 10 pages.
"International Search Report and Written Opinion", Application No. PCT/US2013/028771, dated Jun. 19, 2014, 10 pages.
"International Search Report and Written Opinion", Application No. PCT/US2013/028486, dated Jun. 20, 2014, 10 pages.
"International Search Report and Written Opinion", Application No. PCT/US2013/041017, dated Jul. 17, 2014, 10 pages.
"International Search Report and Written Opinion", Application No. PCT/US2013/028489, dated Jun. 20, 2014, 11 pages.
"International Search Report and Written Opinion", Application No. PCT/US2013/028488, dated Jun. 24, 2014, 11 pages.
"International Search Report and Written Opinion", Application No. PCT/US2013/028767, dated Jun. 24, 2014, 11 pages.
"International Search Report and Written Opinion", Application No. PCT/US2015/045780, dated Oct. 22, 2015, 11 pages.
"International Search Report and Written Opinion", Application No. PCT/US2015/048218, dated Dec. 2, 2015, 11 pages.
"International Search Report and Written Opinion", Application No. PCT/US2014/016654, dated May 16, 2014, 11 pages.
"International Search Report and Written Opinion", Application No. PCT/US2013/028481, dated Jun. 19, 2014, 11 pages.
"International Search Report and Written Opinion", Application No. PCT/US2013/028948, dated Jun. 21, 2013, 11 pages.
"International Search Report and Written Opinion", Application No. PCT/US2013/029461, dated Jun. 21, 2013, 11 pages.
"International Search Report and Written Opinion", Application No. PCT/US2013/028490, dated Jun. 24, 2014, 11 pages.
"International Search Report and Written Opinion", Application No. PCT/US2013/028766, dated Jun. 26, 2014, 11 pages.
"International Search Report and Written Opinion", Application No. PCT/US2013/028772, dated Jun. 30, 2014, 11 pages.
"International Search Report and Written Opinion", Application No. PCT/US2013/040968, dated Sep. 5, 2013, 11 pages.
"International Search Report and Written Opinion", Application No. PCT/US2013/028768, dated Jun. 24, 2014, 12 pages.
"International Search Report and Written Opinion", Application No. PCT/US2013/044871, dated Aug. 14, 2013, 12 pages.
"International Search Report and Written Opinion", Application No. PCT/US2015/042551, dated Oct. 6, 2015, 13 Pages.
"International Search Report and Written Opinion", Application No. PCT/US2015/044944, dated Nov. 11, 2015, 13 pages.
"International Search Report and Written Opinion", Application No. PCT/US2013/028482, dated Jun. 20, 2014, 13 pages.
"International Search Report and Written Opinion", Application No. PCT/US2014/014522, dated Jun. 6, 2014, 13 pages.
"International Search Report and Written Opinion", Application No. PCT/US2015/049270, dated Feb. 23, 2016, 14 pages.
"International Search Report and Written Opinion", Application No. PCT/US2013/042550, dated Sep. 24, 2013, 14 pages.
"International Search Report and Written Opinion", Application No. PCT/US2015/045778, dated Dec. 15, 2015, 15 pages.
"International Search Report and Written Opinion", Application No. PCT/US2013/045283, dated Mar. 12, 2014, 19 pages.
"International Search Report and Written Opinion", Application No. PCT/US2015/022349, dated Jun. 25, 2015, 9 Pages.
"International Search Report and Written Opinion", Application No. PCT/US2015/045468, dated Oct. 29, 2015, 9 Pages.
"International Search Report and Written Opinion", Application No. PCT/US2013/044873, dated Nov. 22, 2013, 9 pages.
"International Search Report and Written Opinion", Application No. PCT/US2013/067905, dated Apr. 15, 2014, 9 pages.
"International Search Report and Written Opinion", Application No. PCT/US2013/028487, dated May 27, 2014, 9 pages.
"International Search Report and Written Opinion", Application No. PCT/US2013/028770, dated Jun. 26, 2014, 9 pages.
"International Search Report and Written Opinion", Application No. PCT/US2012/021004, dated Jul. 30, 2012, 9 pages.
"International Search Report and Written Opinion", Application No. PCT/US2013/045049, dated Sep. 16, 2013, 9 pages.
"Introducing OmniPage Cloud Service", Available at: http://www.nuance.com/for-business/by-product/omnipage/omnipage-cloud-services/index.htm, Sep. 4, 2012, 3 pages.

(56) References Cited

OTHER PUBLICATIONS

"Membrane Keyboards & Membrane Keypads", Retrieved from: <http://www.pannam.com/>on May 9, 2012, Mar. 4, 2009, 2 pages.

"Microsoft Tablet PC", Retrieved from <http://web.archive.org/web/20120622064335/https://en.wikipedia.org/wiki/Microsoft_Tablet_PC> on Jun. 4, 2014, Jun. 21, 2012, 9 pages.

"Motion Sensors", Android Developers—retrieved from <http://developer.android.com/guide/topics/sensors/sensors_motion.html> on May 25, 2012, 2012, 7 pages.

"MPC Fly Music Production Controller", AKAI Professional, Retrieved from: <http://www.akaiprompc.com/mpc-fly> on Jul. 9, 2012, 4 pages.

"neXus Charging Cradle", Retrieved from <http://www.gen-xtech.com/neXus.php> on Jul. 28, 2014, Apr. 17, 2012, 2 pages.

"NI Releases New Maschine & Maschine Mikro", Retrieved from <http://www.djbooth.net/index/dj-equipment/entry/ni-releases-new-maschine-mikro/> on Sep. 17, 2012, 19 pages.

"Non-Final Office Action", U.S. Appl. No. 13/599,635, dated Feb. 25, 2014, 13 pages.

"Non-Final Office Action", U.S. Appl. No. 12/897,947, dated Jun. 7, 2012, 7 pages.

"Non-Final Office Action", U.S. Appl. No. 13/010,552, dated May 8, 2015, 27 pages.

"Non-Final Office Action", U.S. Appl. No. 13/010,552, dated Jul. 8, 2014, 22 pages.

"Non-Final Office Action", U.S. Appl. No. 13/010,552, dated Aug. 12, 2013, 20 pages.

"Non-Final Office Action", U.S. Appl. No. 13/021,448, dated Dec. 13, 2012, 9 pages.

"Non-Final Office Action", U.S. Appl. No. 13/371,725, dated Nov. 7, 2013, 19 pages.

"Non-Final Office Action", U.S. Appl. No. 13/468,882, dated Jul. 9, 2014, 9 pages.

"Non-Final Office Action", U.S. Appl. No. 13/468,918, dated Dec. 26, 2013, 18 pages.

"Non-Final Office Action", U.S. Appl. No. 13/468,949, dated Jun. 20, 2014, 10 pages.

"Non-Final Office Action", U.S. Appl. No. 13/470,951, dated Jul. 2, 2014, 19 pages.

"Non-Final Office Action", U.S. Appl. No. 13/471,001, dated Feb. 19, 2013, 15 pages.

"Non-Final Office Action", U.S. Appl. No. 13/471,001, dated Jun. 17, 2014, 23 pages.

"Non-Final Office Action", U.S. Appl. No. 13/471,030, dated May 15, 2014, 10 pages.

"Non-Final Office Action", U.S. Appl. No. 13/471,054, dated Jun. 3, 2014, 15 pages.

"Non-Final Office Action", U.S. Appl. No. 13/471,139, dated Mar. 21, 2013, 12 pages.

"Non-Final Office Action", U.S. Appl. No. 13/471,186, dated Feb. 27, 2014, 8 pages.

"Non-Final Office Action", U.S. Appl. No. 13/471,202, dated Feb. 11, 2013, 10 pages.

"Non-Final Office Action", U.S. Appl. No. 13/471,237, dated Mar. 24, 2014, 7 pages.

"Non-Final Office Action", U.S. Appl. No. 13/471,282, dated Sep. 3, 2014, 13 pages.

"Non-Final Office Action", U.S. Appl. No. 13/471,336, dated Jan. 18, 2013, 14 pages.

"Non-Final Office Action", U.S. Appl. No. 13/471,336, dated May 7, 2014, 17 pages.

"Non-Final Office Action", U.S. Appl. No. 13/471,376, dated Apr. 2, 2014, 17 pages.

"Non-Final Office Action", U.S. Appl. No. 13/471,405, dated Feb. 20, 2014, 37 pages.

"Non-Final Office Action", U.S. Appl. No. 13/471,412, dated Jul. 11, 2014, 22 pages.

"Non-Final Office Action", U.S. Appl. No. 13/492,232, dated Apr. 30, 2014, 9 pages.

"Non-Final Office Action", U.S. Appl. No. 13/527,263, dated Apr. 3, 2014, 6 pages.

"Non-Final Office Action", U.S. Appl. No. 13/527,263, dated Jul. 19, 2013, 5 pages.

"Non-Final Office Action", U.S. Appl. No. 13/563,435, dated Jun. 14, 2013, 6 pages.

"Non-Final Office Action", U.S. Appl. No. 13/564,520, dated Feb. 14, 2014, 5 pages.

"Non-Final Office Action", U.S. Appl. No. 13/564,520, dated Jun. 19, 2013, 8 pages.

"Non-Final Office Action", U.S. Appl. No. 13/564,520, dated Jun. 16, 2014, 5 pages.

"Non-Final Office Action", U.S. Appl. No. 13/565,124, dated Jun. 17, 2013, 5 pages.

"Non-Final Office Action", U.S. Appl. No. 13/595,700, dated Jun. 18, 2014, 8 pages.

"Non-Final Office Action", U.S. Appl. No. 13/599,763, dated May 28, 2014, 6 pages.

"Non-Final Office Action", U.S. Appl. No. 13/603,918, dated Sep. 2, 2014, 13 pages.

"Non-Final Office Action", U.S. Appl. No. 13/603,918, dated Dec. 19, 2013, 12 pages.

"Non-Final Office Action", U.S. Appl. No. 13/645,405, dated Jan. 31, 2014, 6 pages.

"Non-Final Office Action", U.S. Appl. No. 13/645,405, dated Aug. 11, 2014, 5 pages.

"Non-Final Office Action", U.S. Appl. No. 13/647,479, dated Apr. 28, 2015, 11 pages.

"Non-Final Office Action", U.S. Appl. No. 13/647,479, dated Jul. 3, 2014, 10 pages.

"Non-Final Office Action", U.S. Appl. No. 13/651,195, dated Jan. 2, 2013, 14 pages.

"Non-Final Office Action", U.S. Appl. No. 13/651,232, dated Jan. 17, 2013, 15 pages.

"Non-Final Office Action", U.S. Appl. No. 13/651,232, dated Dec. 5, 2013, 15 pages.

"Non-Final Office Action", U.S. Appl. No. 13/651,272, dated Feb. 12, 2013, 10 pages.

"Non-Final Office Action", U.S. Appl. No. 13/651,287, dated Jan. 29, 2013, 13 pages.

"Non-Final Office Action", U.S. Appl. No. 13/651,304, dated Mar. 22, 2013, 9 pages.

"Non-Final Office Action", U.S. Appl. No. 13/651,327, dated Mar. 22, 2013, 6 pages.

"Non-Final Office Action", U.S. Appl. No. 13/651,726, dated Apr. 15, 2013, 6 pages.

"Non-Final Office Action", U.S. Appl. No. 13/651,871, dated Mar. 18, 2013, 14 pages.

"Non-Final Office Action", U.S. Appl. No. 13/651,871, dated Jul. 1, 2013, 5 pages.

"Non-Final Office Action", U.S. Appl. No. 13/651,976, dated Feb. 22, 2013, 16 pages.

"Non-Final Office Action", U.S. Appl. No. 13/651,976, dated Jun. 16, 2014, 23 pages.

"Non-Final Office Action", U.S. Appl. No. 13/653,321, dated Feb. 1, 2013, 13 pages.

"Non-Final Office Action", U.S. Appl. No. 13/653,682, dated Feb. 7, 2013, 11 pages.

"Non-Final Office Action", U.S. Appl. No. 13/653,682, dated Feb. 26, 2014, 10 pages.

"Non-Final Office Action", U.S. Appl. No. 13/653,682, dated Jun. 3, 2013, 14 pages.

"Non-Final Office Action", U.S. Appl. No. 13/655,065, dated Apr. 24, 2014, 16 pages.

"Non-Final Office Action", U.S. Appl. No. 13/655,065, dated Aug. 19, 2015, 18 pages.

"Non-Final Office Action", U.S. Appl. No. 13/655,065, dated Dec. 19, 2014, 24 pages.

"Non-Final Office Action", U.S. Appl. No. 13/656,055, dated Mar. 12, 2014, 17 pages.

"Non-Final Office Action", U.S. Appl. No. 13/656,055, dated Apr. 23, 2013, 11 pages.

(56) References Cited

OTHER PUBLICATIONS

"Non-Final Office Action", U.S. Appl. No. 13/656,520, dated Feb. 1, 2013, 15 pages.
"Non-Final Office Action", U.S. Appl. No. 13/656,520, dated Jun. 5, 2013, 8 pages.
"Non-Final Office Action", U.S. Appl. No. 13/715,229, dated Aug. 19, 2014, 9 pages.
"Non-Final Office Action", U.S. Appl. No. 13/759,875, dated Aug. 1, 2014, 16 pages.
"Non-Final Office Action", U.S. Appl. No. 13/773,496, dated Jun. 23, 2014, 10 pages.
"Non-Final Office Action", U.S. Appl. No. 13/780,228, dated Sep. 15, 2014, 18 pages.
"Non-Final Office Action", U.S. Appl. No. 13/780,228, dated Oct. 30, 2013, 12 pages.
"Non-Final Office Action", U.S. Appl. No. 13/938,930, dated Aug. 29, 2013, 9 pages.
"Non-Final Office Action", U.S. Appl. No. 13/939,002, dated Aug. 28, 2013, 6 pages.
"Non-Final Office Action", U.S. Appl. No. 13/939,002, dated Dec. 20, 2013, 5 pages.
"Non-Final Office Action", U.S. Appl. No. 13/939,032, dated Aug. 29, 2013, 7 pages.
"Non-Final Office Action", U.S. Appl. No. 13/974,749, dated May 8, 2014, 16 pages.
"Non-Final Office Action", U.S. Appl. No. 13/974,994, dated Jun. 4, 2014, 24 pages.
"Non-Final Office Action", U.S. Appl. No. 13/975,087, dated May 8, 2014, 18 pages.
"Non-Final Office Action", U.S. Appl. No. 14/033,510, dated Jun. 5, 2014, 16 pages.
"Non-Final Office Action", U.S. Appl. No. 14/063,912, dated Jan. 2, 2014, 10 pages.
"Non-Final Office Action", U.S. Appl. No. 14/063,912, dated Sep. 2, 2014, 11 pages.
"Non-Final Office Action", U.S. Appl. No. 14/199,924, dated Apr. 10, 2014, 6 pages.
"Non-Final Office Action", U.S. Appl. No. 14/200,595, dated Apr. 11, 2014, 4 pages.
"Non-Final Office Action", U.S. Appl. No. 14/225,250, dated Jun. 17, 2014, 5 pages.
"Non-Final Office Action", U.S. Appl. No. 14/225,276, dated Jun. 13, 2014, 6 pages.
"Non-Final Office Action", U.S. Appl. No. 14/229,507, dated Nov. 10, 2015, 11 pages.
"Non-Final Office Action", U.S. Appl. No. 14/277,240, dated Jun. 13, 2014, 6 pages.
"Non-Final Office Action", U.S. Appl. No. 14/450,023, dated Sep. 25, 2015, 18 pages.
"Non-Final Office Action", U.S. Appl. No. 14/462,820, dated Dec. 21, 2015, 33 pages.
"Non-Final Office Action", U.S. Appl. No. 14/465,307, dated Jan. 29, 2016, 8 pages.
"Non-Final Office Action", U.S. Appl. No. 14/468,699, dated May 15, 2015, 6 pages.
"Non-Final Office Action", U.S. Appl. No. 14/468,699, dated Oct. 16, 2015, 8 pages.
"Non-Final Office Action", U.S. Appl. No. 14/477,014, dated Sep. 29, 2015, 18 pages.
"Non-Final Office Action", U.S. Appl. No. 14/697,501, dated Sep. 29, 2015, 11 pages.
"Notice of Allowance", U.S. Appl. No. 12/897,947, dated Oct. 8, 2013, 8 pages.
"Notice of Allowance", U.S. Appl. No. 13/468,918, dated Jun. 17, 2014, 5 pages.
"Notice of Allowance", U.S. Appl. No. 13/470,633, dated Mar. 22, 2013, 7 pages.
"Notice of Allowance", U.S. Appl. No. 13/471,030, dated Sep. 5, 2014, 6 pages.
"Notice of Allowance", U.S. Appl. No. 13/471,139, dated Mar. 17, 2014, 4 pages.
"Notice of Allowance", U.S. Appl. No. 13/471,186, dated Jul. 3, 2014, 7 pages.
"Notice of Allowance", U.S. Appl. No. 13/471,202, dated May 28, 2013, 7 pages.
"Notice of Allowance", U.S. Appl. No. 13/471,237, dated May 12, 2014, 8 pages.
"Notice of Allowance", U.S. Appl. No. 13/471,405, dated Jun. 24, 2014, 9 pages.
"Notice of Allowance", U.S. Appl. No. 13/563,435, dated Nov. 12, 2013, 5 pages.
"Notice of Allowance", U.S. Appl. No. 13/565,124, dated Dec. 24, 2013, 6 pages.
"Notice of Allowance", U.S. Appl. No. 13/599,763, dated Feb. 18, 2015, 4 pages.
"Notice of Allowance", U.S. Appl. No. 13/603,918, dated Jan. 22, 2015, 8 pages.
"Notice of Allowance", U.S. Appl. No. 13/647,479, dated Jan. 14, 2016, 8 pages.
"Notice of Allowance", U.S. Appl. No. 13/651,195, dated Jul. 8, 2013, 9 pages.
"Notice of Allowance", U.S. Appl. No. 13/651,232, dated Apr. 25, 2014, 9 pages.
"Notice of Allowance", U.S. Appl. No. 13/651,272, dated May 2, 2013, 7 pages.
"Notice of Allowance", U.S. Appl. No. 13/651,287, dated May 2, 2014, 6 pages.
"Notice of Allowance", U.S. Appl. No. 13/651,304, dated Jul. 1, 2013, 5 pages.
"Notice of Allowance", U.S. Appl. No. 13/651,327, dated Jun. 11, 2013, 7 pages.
"Notice of Allowance", U.S. Appl. No. 13/651,726, dated May 31, 2013, 5 pages.
"Notice of Allowance", U.S. Appl. No. 13/651,871, dated Oct. 2, 2013, 7 pages.
"Notice of Allowance", U.S. Appl. No. 13/653,321, dated Dec. 18, 2013, 4 pages.
"Notice of Allowance", U.S. Appl. No. 13/656,520, dated Oct. 2, 2013, 5 pages.
"Notice of Allowance", U.S. Appl. No. 13/715,133, dated Jan. 6, 2014, 7 pages.
"Notice of Allowance", U.S. Appl. No. 13/938,930, dated Feb. 20, 2014, 4 pages.
"Notice of Allowance", U.S. Appl. No. 13/939,002, dated Mar. 3, 2014, 4 pages.
"Notice of Allowance", U.S. Appl. No. 13/939,032, dated Apr. 3, 2014, 4 pages.
"Notice of Allowance", U.S. Appl. No. 14/018,286, dated May 23, 2014, 8 pages.
"Notice of Allowance", U.S. Appl. No. 14/199,924, dated Jun. 10, 2014, 4 pages.
"Notice of Allowance", U.S. Appl. No. 14/277,240, dated Sep. 16, 2014, 4 pages.
"Notice of Allowance", U.S. Appl. No. 14/465,307, dated Jun. 2, 2016, 7 pages.
"Notice of Allowance", U.S. Appl. No. 14/468,699, dated Mar. 11, 2016, 8 pages.
"Notice of Allowance", U.S. Appl. No. 14/486,381, dated Apr. 13, 2016, 7 pages.
"Notice to Grant", CN Application No. 201320097089.9, dated Sep. 29, 2013, 2 Pages.
"Notice to Grant", CN Application No. 201320097124.7, dated Oct. 8, 2013, 2 pages.
"OmniPage Standard 18", Available at: http://ocr-software-review.toptenreviews.com/omnipage-standard-review.html, Oct. 27, 2010, 3 pages.
"On-Screen Keyboard for Windows 7, Vista, XP with Touchscreen", Retrieved from <www.comfort-software.com/on-screen-keyboard.html> on Aug. 28, 2012, Feb. 2, 2011, 3 pages.
"Optical Sensors in Smart Mobile Devices", ON Semiconductor, TND415/D, Available at <http://www.onsemi.jp/pub_link/Collateral/TND415-D.PDF>, Nov. 2010, pp. 1-13.

(56) References Cited

OTHER PUBLICATIONS

"Optics for Displays: Waveguide-based Wedge Creates Collimated Display Backlight", OptoIQ, retrieved from <http://www.optoiq.com/index/photonics-technologies-applications/lfw-display/lfw-article-display.articles.laser-focus-world.volume-46.issue-1.world-news.optics-for_displays.html> on Nov. 2, 2010, Jan. 1, 2010, 3 pages.
"Pearl scan solutions", Available at: http://www.pearl-scan.co.uk/document-conversion/OCR-conversion.php, Aug. 21, 2008, 2 pages.
"Position Sensors", Android Developers—retrieved from <http://developer.android.com/guide/topics/sensors/sensors_position.html> on May 25, 2012, 5 pages.
"Rechargeable Stylus Pen", Retrieved from <http://www.e-pens.com/uk/rechargeable-stylus-pen.html> on Jul. 28, 2014, Jul. 5, 2013, 1 pages.
"Reflex LCD Writing Tablets", retrieved from <http://www.kentdisplays.com/products/lcdwritingtablets.html> on Jun. 27, 2012, 3 pages.
"Restriction Requirement", U.S. Appl. No. 13/468,918, dated Nov. 29, 2013, 6 pages.
"Restriction Requirement", U.S. Appl. No. 13/603,918, dated Nov. 27, 2013, 8 pages.
"Restriction Requirement", U.S. Appl. No. 13/715,133, dated Oct. 28, 2013, 6 pages.
"Restriction Requirement", U.S. Appl. No. 12/897,947, dated May 11, 2012, 7 pages.
"Restriction Requirement", U.S. Appl. No. 13/471,139, dated Jan. 17, 2013, 7 pages.
"Restriction Requirement", U.S. Appl. No. 13/595,700, dated May 28, 2014, 6 pages.
"Restriction Requirement", U.S. Appl. No. 13/651,304, dated Jan. 18, 2013, 7 pages.
"Restriction Requirement", U.S. Appl. No. 13/651,726, dated Feb. 22, 2013, 6 pages.
"Restriction Requirement", U.S. Appl. No. 13/651,871, dated Feb. 7, 2013, 6 pages.
"Restriction Requirement", U.S. Appl. No. 13/653,184, dated Sep. 5, 2014, 6 pages.
"Restriction Requirement", U.S. Appl. No. 13/715,133, dated Dec. 3, 2013, 6 pages.
"Restriction Requirement", U.S. Appl. No. 13/715,229, dated Aug. 13, 2013, 7 pages.
"Restriction Requirement", U.S. Appl. No. 14/486,381, dated Mar. 7, 2016, 6 pages.
"ScanSnap ix500 Scanning into Excel", Retrieved on: Feb. 20, 2014, Available at: http://www.youtube.com/watch?v=PvpH4NAzUjM, 2 pages.
"Scansnap", Available at: http://scanners.fcpa.fujitsu.com/scansnapit/scansnap-ix500.php, Jan. 11, 2013, 4 pages.
"Second Written Opinion", Application No. PCT/US2015/044402, dated Apr. 6, 2016, 4 pages.
"SMART Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>, 2009, 2 pages.
"SolRxTM E-Series Multidirectional Phototherapy ExpandableTM 2-Bulb Full Body Panel System", Retrieved from: < http://www.solarcsystems.com/us_multidirectional_uv_light_therapy_1_intro.html > on Jul. 25, 2012, 2011, 4 pages.
"Supplemental Notice of Allowance", U.S. Appl. No. 13/471,405, dated Aug. 29, 2014, 5 pages.
"Supplemental Notice of Allowance", U.S. Appl. No. 13/603,918, dated Apr. 20, 2015, 8 pages.
"Supplemental Notice of Allowance", U.S. Appl. No. 13/653,321, dated Mar. 28, 2014, 4 pages.
"Supplemental Notice of Allowance", U.S. Appl. No. 14/018,286, dated Jun. 11, 2014, 5 pages.
"Supplemental Notice of Allowance", U.S. Appl. No. 14/468,699, dated May 9, 2016, 4 pages.
"Supplemental Notice of Allowance", U.S. Appl. No. 14/468,699, dated Jun. 20, 2016, 4 pages.
"Teach Me Simply", Retrieved From: <http://techmesimply.blogspot.in/2013/05/yugatech_3.html> on Nov. 22, 2013, May 3, 2013, pp. 1-6.
"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, Jun. 2012, 2 pages.
"Tilt Shift Lenses: Perspective Control", retrieved from http://www.cambridgeincolour.com/tutorials/tilt-shift-lenses1.htm, Mar. 28, 2008, 11 Pages.
"Understanding the Compatibility View List", Retrieved From: <http://msdn.microsoft.com/en-us/library/dd567845(v=vs.85).aspx> Jun. 11, 2014, Mar. 2011, 5 Pages.
"Virtualization Getting Started Guide", Red Hat Enterprise Linux 6, Edition 0.2—retrieved from <http://docs.redhat.com/docs/en-US/Red_Hat_Enterprise_Linux/6/html-single/Virtualization_Getting_Started_Guide/index.html> on Jun. 13, 2012, 24 pages.
"Visual Basic 6.0 Code Advisor", Retrieved from: <http://msdn.microsoft.com/en-us/vbasic/ms789135.aspx> on Nov. 11, 2010, 2006, 2 pages.
"Web Site Maintenance Tools, Software", Retrieved from: <http://websitetips.com/tools/> on Nov. 11, 2010, Nov. 11, 2010, 10 pages.
"Welcome to Windows 7", Retrieved from: <http://www.microsoft.com/en-us/download/confirmation.aspx?id=4984> on Aug. 1, 2013, Sep. 16, 2009, 3 pages.
"What is Active Alignment?", http://www.kasalis.com/active_alignment.html, retrieved on Nov. 22, 2012, Nov. 22, 2012, 2 Pages.
"Write & Learn Spellboard Advanced", Available at <http://somemanuals.com/VTECH,WRITE%2526LEARN--SPELLBOARD--ADV--71000,JIDFHE.PDF>, 2006, 22 pages.
Bathiche,"Input Device with Interchangeable Surface", U.S. Appl. No. 13/974,749, filed Aug. 23, 2013, 51 pages.
Block,"DeviceOrientation Event Specification", W3C, Editor's Draft, retrieved from <https://developer.palm.com/content/api/dev-guide/pdk/accessing-device-sensors.html> on May 25, 2012, Jul. 12, 2011, 14 pages.
Bohge,"The Use of Guard Bands to Mitigate Multiple Access Interference in the OFDMA Uplink", In Proceedings of 13th International OFDM-Workshop, Aug. 2008, 5 Pages.
Brown,"Microsoft Shows Off Pressure-Sensitive Keyboard", retrieved from <http://news.cnet.com/8301-17938_105-10304792-1.html> on May 7, 2012, Aug. 6, 2009, 2 pages.
Butler,"SideSight: Multi-"touch" Interaction around Small Devices", In the proceedings of the 21st annual ACM symposium on User interface software and technology., retrieved from <http://research.microsoft.com/pubs/132534/sidesight_crv3.pdf> on May 29, 2012, Oct. 19, 2008, 4 pages.
Chapman,"Review of Cross-Browser Testing Tools", Retrieved From: <http://www.smashingmagazine.com/2011/08/07/a-dozen-cross-browser-testing-tools/> Jun. 9, 2014, Aug. 7, 2011, 13 pages.
Chavan,"Synthesis, Design and Analysis of a Novel Variable Lift Cam Follower System", In Proceedings: International Journal of Design Engineering, vol. 3, Issue 4, Inderscience Publishers, Jun. 3, 2010, 1 Page.
Choudhary,"CROSSCHECK: Combining Crawling and Differencing to Better Detect Cross-browser Incompatibilities in Web Applications", In Proceedings: IEEE Fifth International Conference on Software Testing, Verification and Validation, Apr. 17, 2012, 10 Pages.
Choudhary,"Detecting Cross-browser Issues in Web Applications", In Proceedings: The 33rd International Conference on Software Engineering, May 21, 2011, 3 Pages.
Crider,"Sony Slate Concept Tablet "Grows" a Kickstand", Retrieved from: <http://androidcommunity.com/sony-slate-concept-tablet-grows-a-kickstand-20120116/> on May 4, 2012, Jan. 16, 2012, 9 pages.
Das,"Study of Heat Transfer through Multilayer Clothing Assemblies: A Theoretical Prediction", Retrieved from <http://www.autexrj.com/cms/zalaczone_pliki/5_013_11.pdf>, Jun. 2011, 7 pages.
Dietz,"A Practical Pressure Sensitive Computer Keyboard", In Proceedings of UIST 2009, Oct. 2009, 4 pages.

(56) References Cited

OTHER PUBLICATIONS

Embley,"Table-Processing Paradigms: A Research Survey", International Journal of Document Analysis and Recognition, vol. 8, No. 2-3, May 9, 2006, pp. 66-86.
Gao,"View: Visual Information Extraction Widget for Improving Chart Images Accessibility", Sep. 30, 2012, 4 pages.
Gaver,"A Virtual Window on Media Space", retrieved from <http://www.gold.ac.uk/media/15gaver-smets-overbeeke.MediaSpaceWindow.chi95.pdf> on Jun. 1, 2012, retrieved from <http://www.gold.ac.uk/media/15gaver-smets-overbeeke.MediaSpaceWindow.chi95.pdf> on Jun. 1, 2012, May 7, 1995, 9 pages.
Glatt,"Channel and Key Pressure (Aftertouch).", Retrieved from: <http://home.roadrunner.com/~jgglatt/tutr/touch.htm> on Jun. 11, 2012, 2012, 2 pages.
Hanlon,"ElekTex Smart Fabric Keyboard Goes Wireless", Retrieved from: <http://www.gizmag.com/go/5048/ > on May 7, 2012, Jan. 15, 2006, 5 pages.
Harada,"VoiceDraw: A Hands-Free Voice-Driven Drawing Application for People With Motor Impairments", In Proceedings of Ninth International ACM SIGACCESS Conference on Computers and Accessibility, retrieved from <http://citeseerx.ist.psu.edu/viewdoc/download?doi=10.1.1.113.7211&rep=rep1&type=pdf> on Jun. 1, 2012, Oct. 15, 2007, 8 pages.
Hinckley,"Touch-Sensing Input Devices", In Proceedings of ACM SIGCHI 1999, May 15, 1999, 8 pages.
Iwase,"Multistep Sequential Batch Assembly of Three-Dimensional Ferromagnetic Microstructures with Elastic Hinges", Retrieved at <<http://ieeexplore.ieee.org/stamp/stamp.jsp?tp=&arnumber=1549861>> Proceedings: Journal of Microelectromechanical Systems, Dec. 2005, 7 pages.
Justin,"SEIDIO ACTIVE with Kickstand for the Galaxy SIII", Retrieved From: <http://www.t3chniq.com/seidio-active-with-kickstand-gs3/> on Nov. 22, 2013, Jan. 3, 2013, 5 Pages.
Kang,"An Opportunistic Indoors Positioning Scheme Based on Estimated Positions", In Proceedings: IEEE Symposium on Computers and Communications, Jul. 5, 2009, 7 Pages.
Kaufmann,"Hand Posture Recognition Using Real-time Artificial Evolution", EvoApplications'09, retrieved from <http://evelyne.lutton.free.fr/Papers/KaufmannEvolASP2010.pdf> on Jan. 5, 2012, Apr. 3, 2010, 10 pages.
Kaur,"Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012, Jun. 21, 2010, 4 pages.
Khuntontong,"Fabrication of Molded Interconnection Devices by Ultrasonic Hot Embossing on Thin Polymer Films", IEEE Transactions on Electronics Packaging Manufacturing, vol. 32, No. 3, Jul. 2009, pp. 152-156.
Kim,"Chrome Extensions for Web Development", Retrieved from: <http://googlecode.blogspot.com/2010/05/chrome-extensions-for-web-development.html> on Nov. 11, 2010, May 27, 2010, 4 pages.
Kristianto,"Cross Browser Compatibility Check Tools", Retrieved from: <http://www.ivankristianto.com/web-development/designs/cross-browser-compatibility-check-tools/1202/> on Nov. 11, 2010, Jan. 26, 2010, 14 pages.
Lahr,"Development of a Novel Cam-based Infinitely Variable Transmission", Proceedings: In Thesis of Master of Science in Mechanical Engineering, Virginia Polytechnic Institute and State University, Nov. 6, 2009, 91 pages.
Lambert,"Cam Design", In Proceedings: Kinematics and dynamics of Machine, University of Waterloo Department of Mechanical Engineering, Jul. 2, 2002, pp. 51-60.
Lane,"Media Processing Input Device", U.S. Appl. No. 13/655,065, filed Oct. 18, 2012, 43 pages.
Lee,"LED Light Coupler Design for a Ultra Thin Light Guide", Journal of the Optical Society of Korea, vol. 11, Issue.3, Retrieved from <http://opticslab.kongju.ac.kr/pdf/06.pdf>, Sep. 2007, 5 pages.
Li,"Characteristic Mode Based Tradeoff Analysis of Antenna-Chassis Interactions for Multiple Antenna Terminals", In IEEE Transactions on Antennas and Propagation, Retrieved from <http://ieeexplore.ieee.org/stamp/stamp.jsp?tp=&arnumber=6060882>, Feb. 2012, 13 pages.
Linderholm,"Logitech Shows Cloth Keyboard for PDAs", Retrieved from: <http://www.pcworld.com/article/89084/logitech_shows_cloth_keyboard_for_pdas.html> on May 7, 2012, Mar. 15, 2002, 5 pages.
Manresa-Yee,"Experiences Using a Hands-Free Interface", In Proceedings of the 10th International ACM SIGACCESS Conference on Computers and Accessibility, retrieved from <http://dmi.uib.es/~cmanresay/Research/%5BMan08%5DAssets08.pdf> on Jun. 1, 2012, Oct. 13, 2008, pp. 261-262.
McLellan,"Eleksen Wireless Fabric Keyboard: a first look", Retrieved from: <http://www.zdnetasia.com/eleksen-wireless-fabric-keyboard-a-first-look-40278954.htm> on May 7, 2012, Jul. 17, 2006, 9 pages.
McPherson,"TouchKeys: Capacitive Multi-Touch Sensing on a Physical Keyboard", In Proceedings of NIME 2012, May 2012, 4 pages.
Mesbah,"Automated Cross-Browser Compatibility Testing", In Proceedings: the 33rd International Conference on Software Engineering, May 21, 2011, 10 Pages.
Miller,"MOGA gaming controller enhances the Android gaming experience", Retrieved from <http://www.zdnet.com/moga-gaming-controller-enhances-the-android-gaming-experience-7000007550/> on Nov. 20, 2012, Nov. 18, 2012, 9 pages.
Mishchenko,"Chart image understanding and numerical data extraction", Sixth International Conference on Digital Information Management (ICDIM), Sep. 26, 2011, 20 pages.
Nakanishi,"Movable Cameras Enhance Social Telepresence in Media Spaces", In Proceedings of the 27th International Conference on Human Factors in Computing Systems, retrieved from <http://smg.ams.eng.osaka-u.ac.jp/~nakanishi/hnp_2009_chi.pdf> on Jun. 1, 2012, Apr. 6, 2009, 10 pages.
Odegard,"My iPad MagPad concept", Retrieved from <http://www.pocketables.com/2011/02/my-ipad-magpad-concept.html> on Oct. 1, 2015, Feb. 26, 2011, 8 pages.
Piltch,"ASUS Eee Pad Slider SL101 Review", Retrieved from <http://www.laptopmag.com/review/tablets/asus-eee-pad-slider-sl101.aspx>, Sep. 22, 2011, 5 pages.
Post,"E-Broidery: Design and Fabrication of Textile-Based Computing", IBM Systems Journal, vol. 39, Issue 3 & 4, Jul. 2000, pp. 840-860.
Prospero,"Samsung Outs Series 5 Hybrid PC Tablet", Retrieved from: <http://blog.laptopmag.com/samsung-outs-series-5-hybrid-pc-tablet-running-windows-8> on Oct. 31, 2013, Jun. 4, 2012, 7 pages.
Purcher,"Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012, Retrieved from: <http://www.patentlyapple.com/patently-apple/2012/01/apple-is-paving-the-way-for-a-new-3d-gui-for-ios-devices.html> on Jun. 4, 2012, Jan. 12, 2012, 15 pages.
Qin,"pPen: Enabling Authenticated Pen and Touch Interaction on Tabletop Surfaces", In Proceedings of ITS 2010—Available at <http://www.dfki.de/its2010/papers/pdf/po172.pdf>, Nov. 2010, pp. 283-284.
Reilink,"Endoscopic Camera Control by Head Movements for Thoracic Surgery", In Proceedings of 3rd IEEE RAS & EMBS International Conference of Biomedical Robotics and Biomechatronics, retrieved from <http://doc.utwente.nl/74929/1/biorob_online.pdf> on Jun. 1, 2012, Sep. 26, 2010, pp. 510-515.
Ross,"IE9 Compat Inspector", Retrieved From: <http://blogs.msdn.com/b/ie/archive/2011/04/27/ie9-compat-inspector.aspx> Jun. 11, 2014, Apr. 27, 2011, 7 Pages.
Sadek,"Method and Apparatus for Performing Carrier Sense Adaptive Transmission in Unlicensed Spectrum", U.S. Appl. No. 61/981,608, filed Apr. 18, 2014, 41 pages.
Sanap,"Design and Analysis of Globoidal Cam Index Drive", Proceedings: In International Journal of Scientific Research Engineering & Technology, Jun. 2013, 6 Pages.
Savva,"ReVision: Automated Classification, Analysis and Redesign of Chart Images", Oct. 16, 2011, 10 pages.
Siddiqui,"Hinge Mechanism for Rotatable Component Attachment", U.S. Appl. No. 13/852,848, filed Mar. 28, 2013, 51 pages.

(56) References Cited

OTHER PUBLICATIONS

Staff,"Gametel Android controller turns tablets, phones into portable gaming devices", Retrieved from <http://www.mobiletor.com/2011/11/18/gametel-android-controller-turns-tablets-phones-into-portable-gaming-devices/#> on Nov. 20, 2012, Nov. 18, 2011, 5 pages.
Sumimoto,"Touch & Write: Surface Computing With Touch and Pen Input", Retrieved from: <http://www.gottabemobile.com/2009/08/07/touch-write-surface-computing-with-touch-and-pen-inputi> on Jun. 19, 2012, Aug. 7, 2009, 4 pages.
Sundstedt,"Gazing at Games: Using Eye Tracking to Control Virtual Characters", In ACM SIGGRAPH 2010 Courses, retrieved from <http://www.tobii.com/Global/Analysis/Training/EyeTrackAwards/veronica_sundstedt.pdf> on Jun. 1, 2012, Jul. 28, 2010, 85 pages.
Takamatsu,"Flexible Fabric Keyboard with Conductive Polymer-Coated Fibers", In Proceedings of Sensors 2011, Oct. 28, 2011, 4 pages.
Travis,"Collimated Light from a Waveguide for a Display Backlight", Optics Express, 19714, vol. 17, No. 22, retrieved from <http://download.microsoft.com/download/D/2/E/D2E425F8-CF3C-4C71-A4A2-70F9D4081007/OpticsExpressbacklightpaper.pdf> on Oct. 15, 2009, Oct. 15, 2009, 6 pages.
Travis,"The Design of Backlights for View-Sequential 3D", retrieved from <http://download.microsoft.com/download/D/2/E/D2E425F8-CF3C-4C71-A4A2-70F9D4081007/Backlightforviewsequentialautostereo.docx> on Nov. 1, 2010, 4 pages.
Valli,"Notes on Natural Interaction", retrieved from <http://www.idemployee.id.tue.nl/g.w.m.rauterberg/lecturenotes/valli-2004.pdf> on Jan. 5, 2012, Sep. 2005, 80 pages.
Valliath,"Design of Hologram for Brightness Enhancement in Color LCDs", Retrieved from <http://www.loreti.it/Download/PDF/LCD/44_05.pdf> on Sep. 17, 2012, May 1998, 5 pages.
Van"Lenovo Thinkpad Tablet 2 Review", Retrieved from: <http://www.digitaltrends.com/tablet-reviews/lenovo-thinkpad-tablet-2-review/> Jan. 29, 2014, Feb. 12, 2013, 7 Pages.
Vaucelle,"Scopemate, a Robotic Microscope!", Architectradure, retrieved from <http://architectradure.blogspot.com/2011/10/at-uist-this-monday-scopemate-robotic.html> on Jun. 6, 2012, Oct. 17, 2011, 2 pages.
Williams,"A Fourth Generation of LCD Backlight Technology", Retrieved from <http://cds.linear.com/docs/Application%20Note/an65f.pdf>, Nov. 1995, 124 pages.
Xu,"Hand Gesture Recognition and Virtual Game Control Based on 3D Accelerometer and EMG Sensors", IUI'09, Feb. 8-11, 2009, retrieved from <http://sclab.yonsei.ac.kr/courses/10TPR/10TPR.files/Hand%20Gesture%20Recognition%20and%20Virtual%20Game%20Control%20based%20on%203d%20accelerometer%20and%20EMG%20sensors.pdf> on Jan. 5, 2012, Feb. 8, 2009, 5 pages.
Xu,"Vision-based Detection of Dynamic Gesture", ICTM'09, Dec. 5-6, 2009, retrieved from <http://ieeexplore.ieee.org/stamp/stamp.jsp?tp=&arnumber=5412956> on Jan. 5, 2012, Dec. 5, 2009, pp. 223-226.
Yucek,"A Survey of Spectrum Sensing Algorithms for Cognitive Radio Applications", In Proceedings: IEEE Communications Surveys & Tutorials, vol. 11 No. 1, Jan. 1, 2009, 15 pages.
Zhang,"Model-Based Development of Dynamically Adaptive Software", In Proceedings of ICSE 2006, Available at <http://www.irisa.fr/lande/lande/icse-proceedings/icse/p371.pdf>, May 20, 2006, pp. 371-380.
Zhu,"Keyboard before Head Tracking Depresses User Success in Remote Camera Control", In Proceedings of 12th IFIP TC 13 International Conference on Human-Computer Interaction, Part II, retrieved from <http://csiro.academia.edu/Departments/CSIRO_ICT_Centre/Papers?page=5> on Jun. 1, 2012, Aug. 24, 2009, 14 pages.
"Non-Final Office Action", U.S. Appl. No. 14/229,507, dated Aug. 21, 2017, 20 pages.
"Restriction Requirement", U.S. Appl. No. 15/594,435, dated Feb. 22, 2018, 4 pages.
"Restriction Requirement", U.S. Appl. No. 15/594,435, dated Jan. 30, 2018, 8 pages.
"International Search Report and Written Opinion Issued in PCT Application No. PCT/US18/028744", dated Jul. 24, 2018, 11 Pages.

\* cited by examiner

INDUCTIVE PERIPHERAL RETENTION DEVICE

RELATED APPLICATIONS

This application is a divisional of U.S. patent application Ser. No. 14/486,381, filed Sep. 15, 2014, entitled "Inductive Peripheral Retention Device", the entire disclosure of which is hereby incorporated by reference herein in its entirety.

BACKGROUND

Computing devices may employ peripheral devices to aid a user in interacting with the computing device. An example of this is an alternate input device, such as a stylus, that may be used to aid a user in interacting with touchscreen and other functionality of the computing device. A user, for instance, may utilize the stylus to draw on a surface of the touchscreen to make annotations, notes, and other indicia.

Conventional techniques utilized to store the stylus, however, could be problematic in a number of different ways. For example, use of an internal slot to store and retain the stylus through friction or through a push-push type mechanism may create a problem where extra space and parts are required inside the device. This may also cause an increase in the complexity of the device, overall size of the device which may be undesirable for mobile configurations, and may therefore hinder the user's experience with the device.

In another example, use of a lanyard and a pen cap may operate somewhat as an uncontrolled appendage and therefore get caught on other objects, pen caps tend to let the pen fall out due to limitations of a retention force that may be used, and so on. Consequently, a user may choose to forgo use of this additional functionality supported by the peripheral device due to these complications.

SUMMARY

Inductive peripheral retention device techniques are described. In one or more implementations, an apparatus includes a plug configured to removably engage a communication port of a device to form a communicative coupling with the device. The plug is securable to and removable from the device using one or more hands of a user. The apparatus also includes a peripheral securing portion connected to the plug and configured to removably engage a peripheral device via an inductive element formed as a flexible loop and configured to form a communicative coupling between the peripheral device and the device.

In one or more implementations, inductance is detected of a flexible element configured to transfer power to a peripheral device via inductance. Responsive to a determination that the detected inductance is above a threshold, a first power mode is utilized in which a first amount of power is provided to the flexible element. Responsive to a determination that the detected inductance is below a threshold, a second power mode is utilized in which a second amount of power is provided to the flexible element that is less than the first amount of power.

In one or more implementations, an apparatus includes a single ferrous element formed as a single integral piece having a middle portion having a diameter about an axis that is less than a diameter of opposing ends of the single ferrous element along the axis and a coil wrapped around the middle portion such that the coil and the single ferrous element form an inductive coil that is substantially rotationally invariant around the axis when charging This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Computing devices may employ a wide range of peripheral devices to support different types of user interaction with the device. This may include input devices that are configured to be used in addition to the computing device, an example of which is a stylus. However, conventional techniques that are utilized to store peripheral devices are often cumbersome and hindered a user's interaction with both the peripheral device and the computing device.

Inductive peripheral retention device techniques are described. In one or more implementations, a peripheral retention device is configured to be secured to a computing device or other device (e.g., a peripheral device of the computing device such as a monitor, keyboard, and so on) using a plug that is configured to engage a communication port, e.g., a USB port or other port. The peripheral retention device also includes a peripheral securing portion that is connected to the plug to retain a peripheral device, such as a stylus.

The peripheral securing portion, for instance, may include an inductive element formed as a flexible loop that is configured to at least partially surround the peripheral device and form a communicative coupling between the peripheral device and the computing device, such as to charge the peripheral device, transfer data, and so forth. In this way, efficiency of charging using the loop may increase over conventional techniques and flexibility of the loop may be used to limit interference of the loop with a user when not in use, e.g., may lay flat. Additionally, this flexibility may serve as a basis to control power output to the loop and thus improve efficiency of the device as further described in the following.

An inductive element is also described that may be utilized to support rotationally invariant induction. The inductive element, for instance, may be shaped to mimic a barbell such that flux lines of the inductive element have a shape that mimics a donut. In this way, the inductive element may be utilized to support induction by a device without having to rotate the device in a particular orientation, such as for use by a stylus, a flexible hinge of a peripheral device (e.g., keyboard) or computing device, and so on. Further discussion of these features may be found in relation to FIGS. 8 and 9.

In the following discussion, an example environment is first described that may employ the techniques described herein. Example mechanisms are also described which may be performed in the example environment as well as other environments. Consequently, use of the example mechanisms is not limited to the example environment and the example environment is not limited to use of the example mechanisms.

Example Environment

Figure 1:
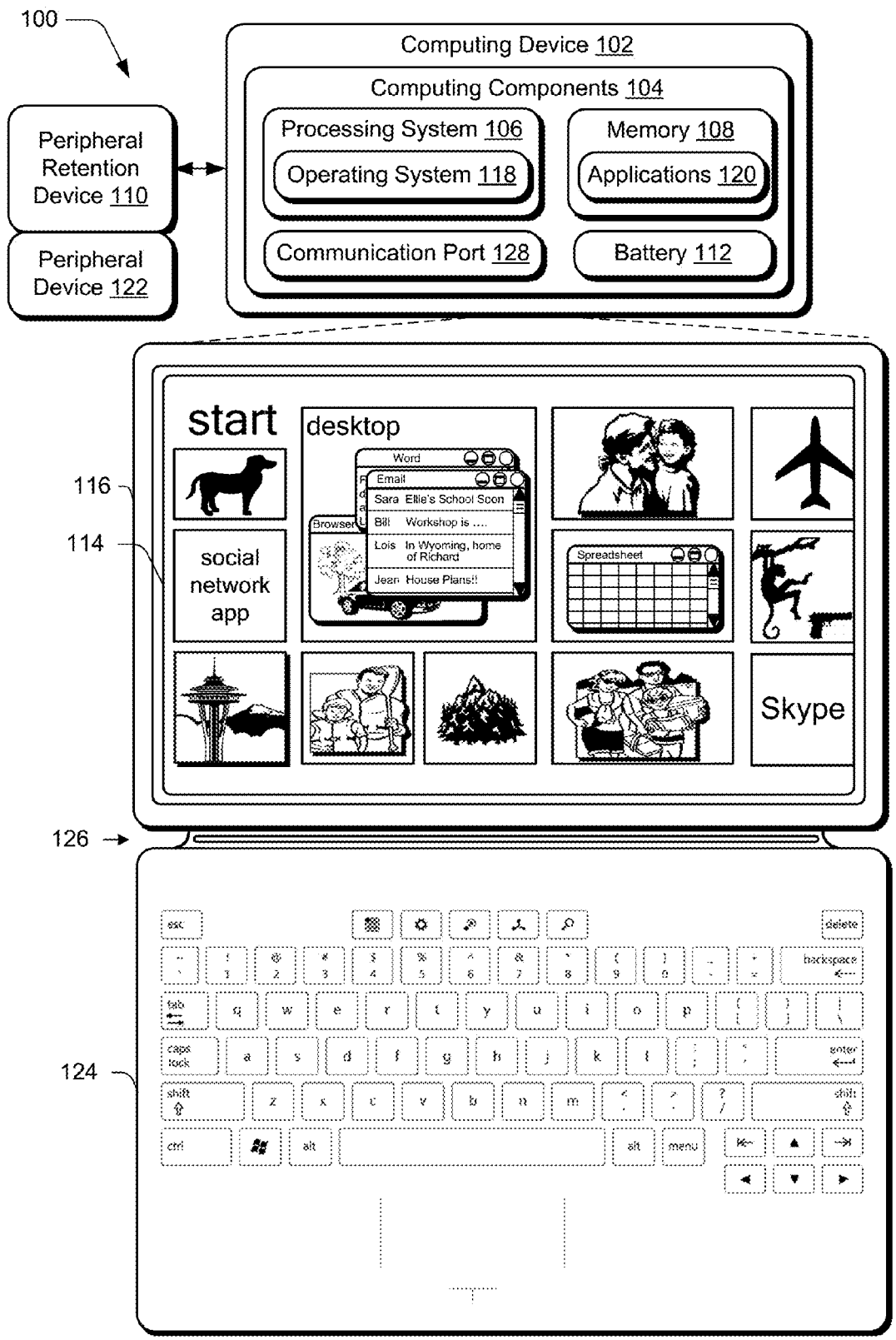
FIG. 1 is an illustration of an environment in an example implementation that is operable to employ the techniques described herein to secure and charge a peripheral device.

FIG. 1 is an illustration of an environment 100 in an example implementation that is operable to employ techniques described herein. The illustrated environment 100 includes a computing device 102 having a plurality of computing components 104 that are implemented at least partially in hardware. Illustrated examples of these computing components 104 include a processing system 106 and a computer-readable storage medium that is illustrated as a memory 108, a peripheral retention device 110, battery 112, and display device 114 that are disposed within and/or secured to a housing 116.

The computing device 102 may be configured in a variety of ways. For example, a computing device may be configured as a computer that is capable of communicating over a network, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles).

The computing device 102 is further illustrated as including an operating system 118. The operating system 118 is configured to abstract underlying functionality of the computing device 102 to applications 120 that are executable on the computing device 102. For example, the operating system 118 may abstract the computing components 104 of the computing device 102 such that the applications 120 may be written without knowing "how" this underlying functionality is implemented. The application 120, for instance, may provide data to the operating system 118 to be rendered and displayed by the display device 114 without understanding how this rendering will be performed, may receive inputs detected using touchscreen functionality of the display device 114, and so on. The operating system 118 may also represent a variety of other functionality, such as to manage a file system and user interface that is navigable by a user of the computing device 102.

The computing device 102 may support a variety of different interactions. For example, the computing device 102 may include one or more hardware devices that are manipulable by a user to interact with the device, which may include peripheral devices 112 (e.g., cursor control device such as a mouse, stylus), a keyboard 124 communicatively and physically coupled to the computing device 102 using a flexible hinge 126, and so on.

Peripheral devices 122 such as a stylus may be lost in some instances by a user because the device is not physically attached to the computing device 102, especially in handheld (i.e., mobile) configurations of the computing device 102. However, conventional techniques that were utilized to secure the stylus to the computing device 102 could consume inordinate amounts of room within a housing 116 (e.g., by internal slot is used to store and retain the stylus through friction or through a push-push type mechanism), interfere with a user's interaction with a device (e.g., a lanyard), and so forth. Accordingly, the peripheral retention device 110 may be configured to secure the peripheral device 122 to the housing 116 in a manner that does not interfere with a user's interaction with the computing device 102.

Further, the peripheral retention device 110 may also be configured to support a communicative coupling with a communication port 128 of the computing device, such as to transfer power to charge the peripheral device 122, communicate data between the peripheral device 122 and the computing device 102, and so on. For example, it is now common practice to use a stylus to draw on the touch enabled displays of laptops and tablets. In some instances, the stylus may be configured to consume power to support this interaction.

In one such instance, an active stylus is configured to improve on detectability of a passive stylus by emitting signals that are received by touchscreen functionality of the display device 114 to improve spatial resolution of a tip of the stylus. The tip may even be located when it is hovering above a surface of the display device 114. The active stylus may also consume power to support Bluetooth® communication, button activated features, and so on. Other features that may consume power include detection of stylus angle and rotation the pen tip to adjust ink thickness, haptic or acoustic feedback of pen function or notifications, support use as a laser pointer for meeting room collaboration, include a text display for status and notifications, communicate device status, email, and others notification with always on communication and LED indicators, support audio recording and data storage, and so forth. This power may be supplied by rechargeable storage included as part of the peripheral device, e.g., a battery or super capacitor.

Conventional techniques utilized to provide power to the rechargeable storage may have a variety of drawbacks. For example, use of a micro USB connector by a stylus generally involves placement of the connector on an end of the stylus opposite the tip. Charging the stylus by plugging it into a USB port also necessitates either having an additional USB cable or plugging directly into a tablet or laptop. This may involve stylus disassembly, a common USB port across the product line, and has a risk of product damage as it is cantilevered while charging.

Another conventional technique involves the addition of conductive charging points to an outside of the stylus to directly connect it to charging points on the device that supplies power, e.g., a computing device. This direct galvanic charging technique, however, may interfere with the industrial design, exposes the contact points to wear and damage, and may be restricted in its alignment to connect the stylus contacts to a power source in a predictable manner.

Accordingly, the peripheral retention device 110 may be configured to support wireless inductive charging. For example, the peripheral device 122 may include a receiving coil inside which, when coupled to an external, powered, primary charging coil of the peripheral retention device 110, form the secondary of a transformer. This air gap transformer is what sends power into the peripheral 122 and thereby support a communicative coupling between the peripheral device 122, the peripheral retention device 110, and the computing device 102 which may also be utilized to communicate data between the devices.

Figure 4:
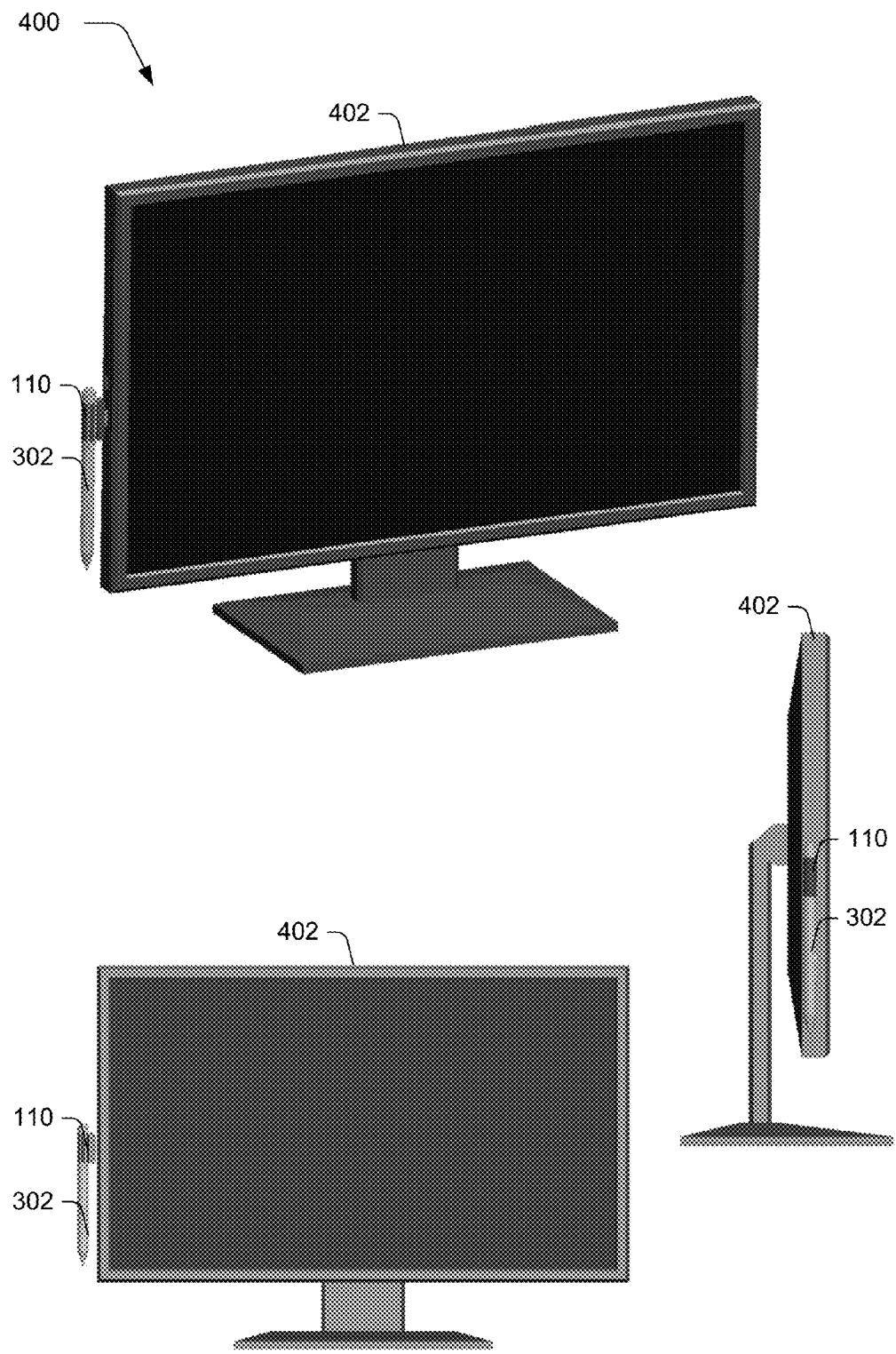
FIG. 4 depicts another example implementation in which the peripheral retention device of FIG. 3 is used to secure the stylus to a standalone display device.

Although the peripheral retention device 110 is illustrated as connected to a communication port 128 of the computing device 102, the peripheral retention device 110 may be coupled to a variety of other devices, such as an external battery device (e.g., for mobile charging), an external charging device (e.g., to plug into a wall socket), a communication port 128 on the input device 124, a monitor as shown in FIG. 4, and so on.

Figure 2:
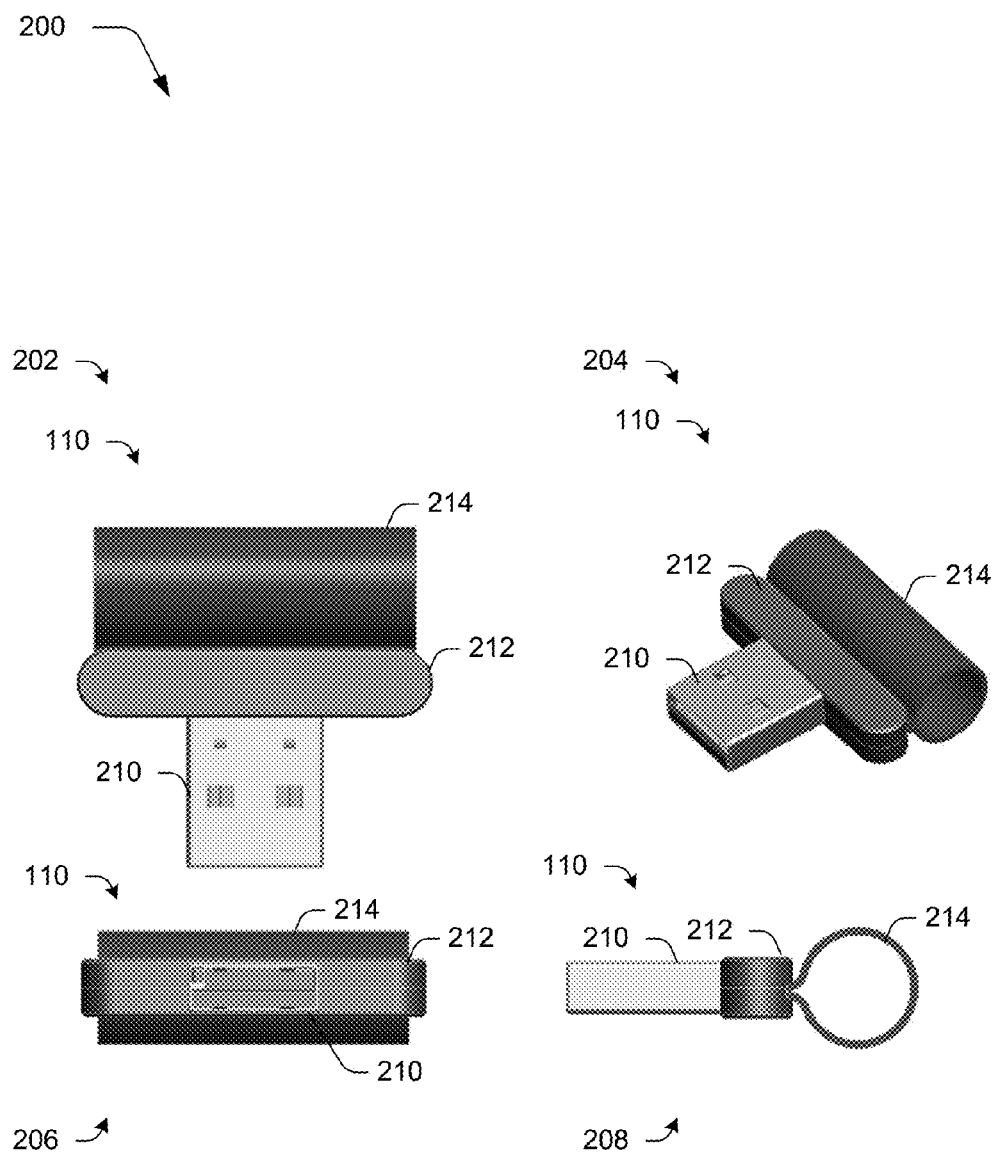
FIG. 2 depicts an example implementation showing different views of an example of a peripheral retention device of FIG. 1.

FIG. 2 depicts an example implementation 200 showing different views of an example of a peripheral retention device 110 of FIG. 1. This example implementation includes top 202, perspective 204, front 206, and side 208 views of an example of a peripheral retention device 110. The peripheral retention device 110 includes a plug 210 that is configured to be secured to a communication port 128 of a device. The plug 210 in this example is illustrated as being formed in compliance with a Type A Universal Serial Bus (USB) but it should be readily apparent that other configurations are also contemplated, such as in compliance with other types of USB ports (e.g., Type B, Mini-AB, Mini-B, Micro-AB, Micro-B, Type C), Thunderbolt® communication ports, and so on. Other examples are also contemplated, such as use without a plug, e.g., permanently mounted to the computing device.

The peripheral retention device 110 also includes a peripheral securing portion 212 connected to the plug and configured to removably engage a peripheral device, which in this example is performed using a flexible loop 214. The flexible loop 214, for example, may be configured to flex and stretch to retain a peripheral device, such as a stylus, within an interior of the flexible loop 214.

Figure 3:
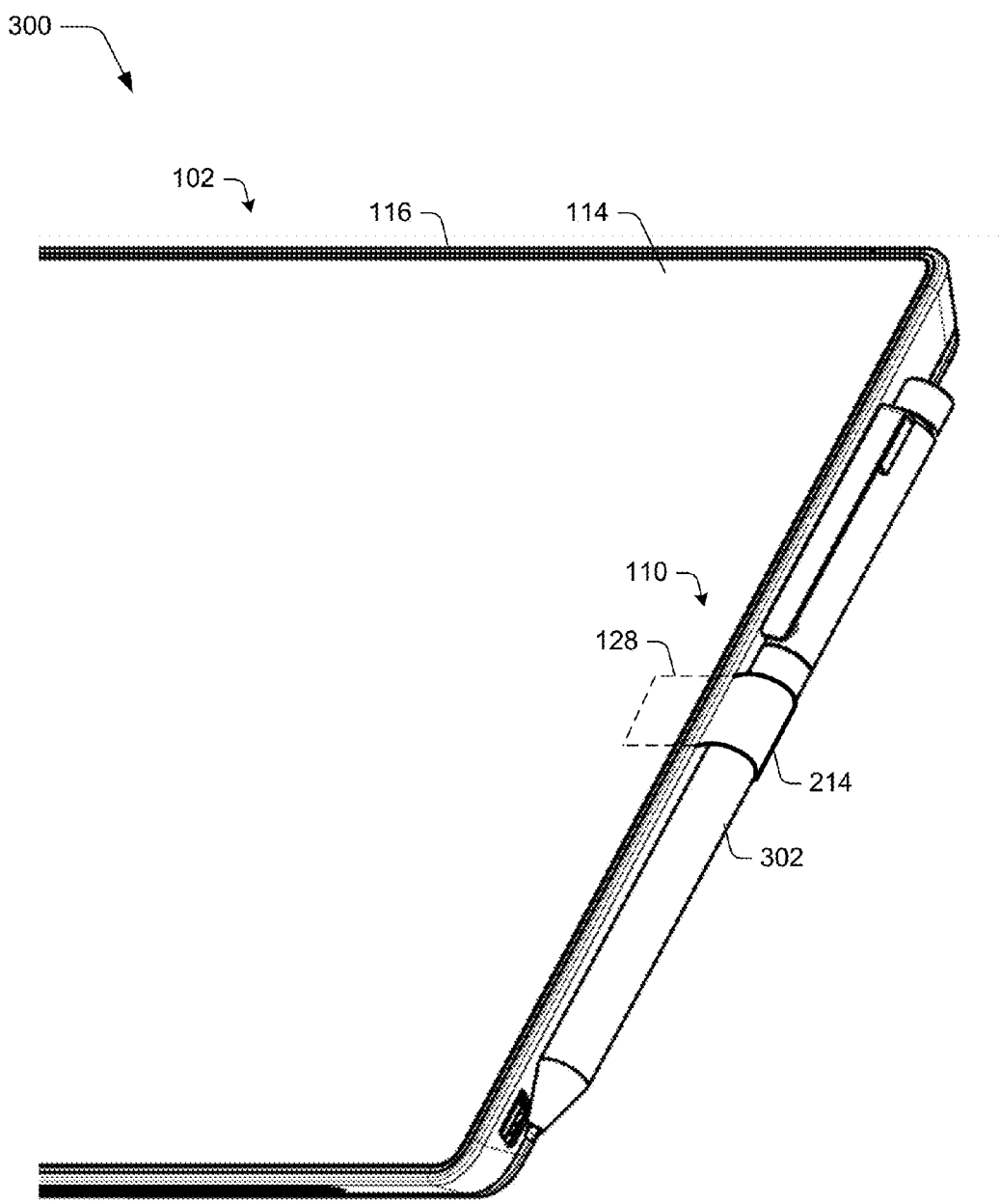
FIG. 3 depicts an example implementation showing retention of a peripheral device configured as a stylus by the peripheral retention device of FIG. 2 thereby securing the stylus to a computing device.

As shown in an example implementation 300 of FIG. 3, for instance, the peripheral retention device 110 may be secured to a communication port 128 which is illustrated in phantom. An example of a peripheral device 122 of FIG. 1 is illustrated as a stylus 302 that is retained within the flexible loop 214 and thus secured to the computing device 102.

In the illustrated example, the flexible loop 214 assumes a complementary shape of the peripheral being secured through use of a flexible material, such as a fabric, rubber, or elastic material. Other examples are also contemplated including examples in which the peripheral retention device 110 utilizes techniques that are not flexible, e.g., is molded to conform to an outer surface of a peripheral device 122 to be retained.

The flexible loop 214 may also be configured to provide a biasing force to secure the peripheral. For example, formation as a flexible and stretchable loop (e.g., elastic) may bias the peripheral toward the housing 116 and thereby retain the peripheral against the housing 116. Other examples are also contemplated.

Figure 11:
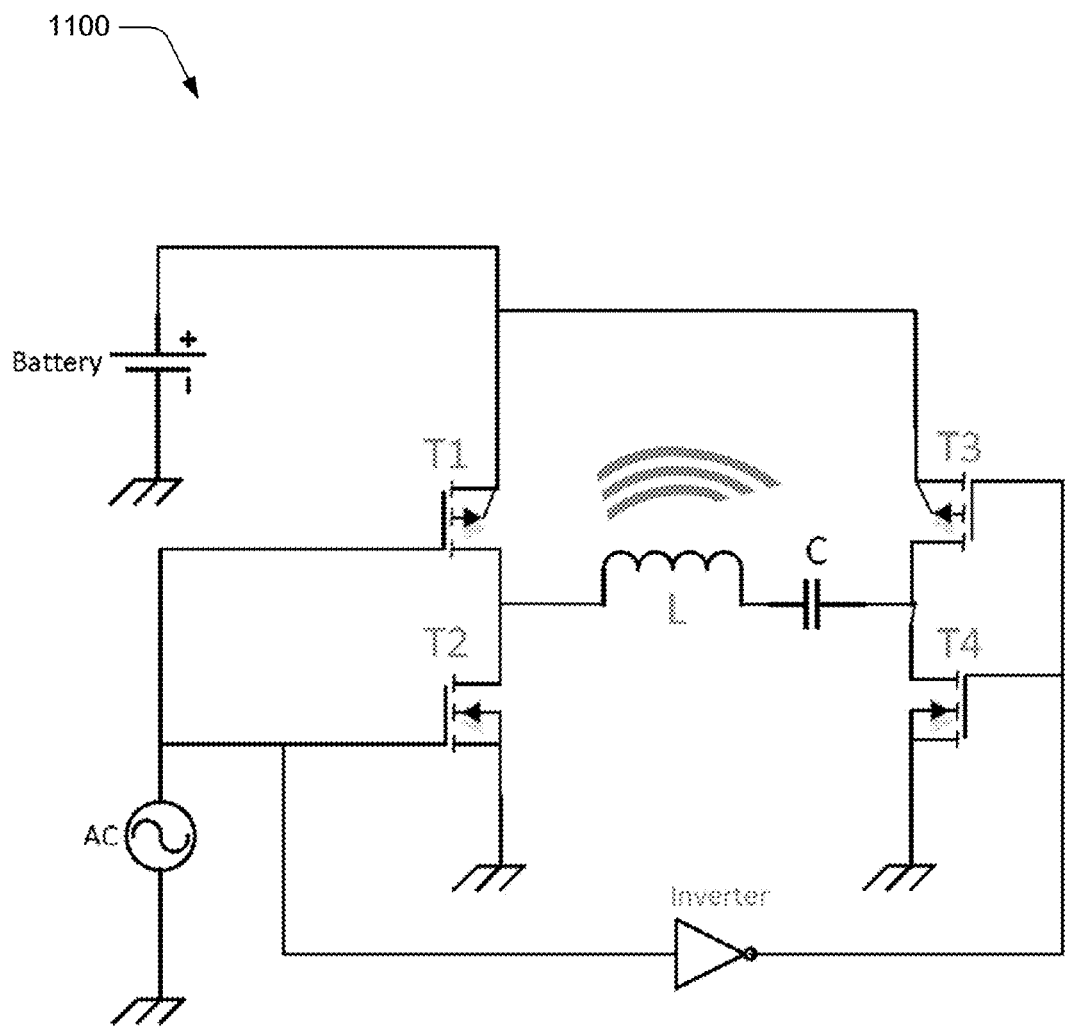
FIG. 11 depicts an example implementation of a circuit usable by a peripheral retention device to act as a primary coil of an air gap transformer.

The use of a flexible material to form the flexible loop 214 may also support a variety of other functionality. For example, the flexible loop 214 may be configured to "flatten" as shown in FIG. 11. The computing device 102, for instance, may be placed on a surface which causes the flexible loop to flatten against the surface when a stylus 302 is not retained by the device. Additionally, this may permit the stylus 302 to "rotate up" away from the surface such that the computing device 102 may lay flat against the surface. In this way, the peripheral retention device 110 does not interfere with a user's interaction with the computing device 102.

FIG. 4 depicts another example implementation 400 in which the peripheral retention device 110 of FIG. 3 is used to secure the stylus 302 to a standalone display device. In this example, the peripheral retention device 110 is secured to a communication port of a standalone display device 402. In this way, the stylus 302 may be secured "out of the way" when not in use. Further, the stylus 302 may also be charged through use of an inductive element formed as part of the peripheral retention device 110, further discussion of which may be found in the following and is shown in a corresponding figure.

Figure 5:
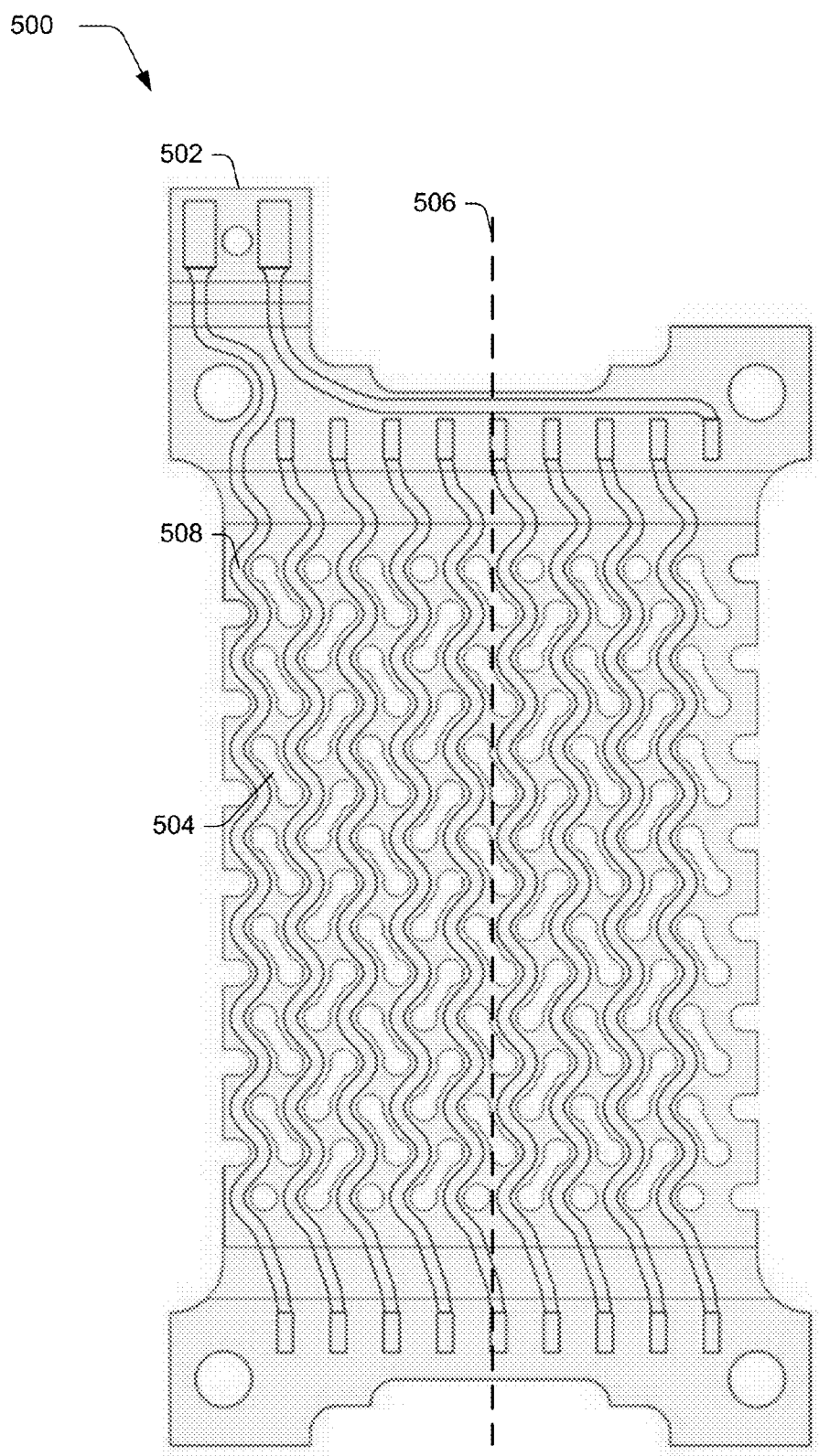
FIG. 5 depicts an example implementation in which an inductive element of a peripheral retention device of FIG. 2 is configured to support flexible movement and stretching.

FIG. 5 depicts an example implementation 500 showing an inductive element 502 of a peripheral retention device 110 of FIG. 3. The inductive element 502 in this example is configured to be both flexible and stretchable. This is performed by including elliptical perforations 504 in this example that have a generally barbell shape in which ends of the perforations 504 have a greater width than a midsection of the perforations 504. Other perforation shapes are also contemplated.

Figure 6:
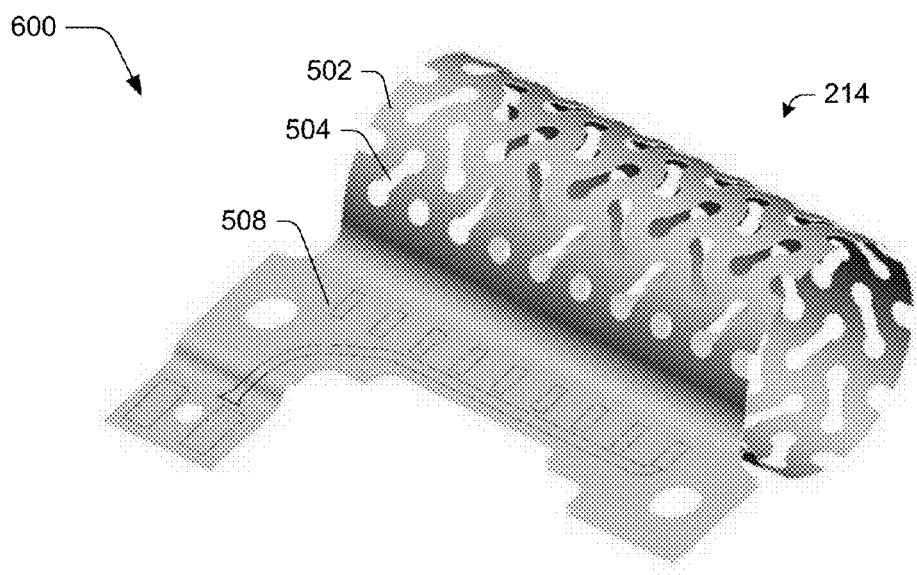
FIG. 6 depicts an example implementation in which an inductive element of FIG. 5 is bent to form a flexible loop.

The perforations 504 are also arranged at a generally forty-five degree angle in relation to a longitudinal axis 506 that is configured to form a bend to assume a cylindrical shape as shown in FIG. 6 and support stretching in both x and y directions. Additionally, the perforations 504 have an alternating arrangement of angles, one to another, in relation to the axis 506.

The inductive element 502 also includes traces 508 that are configured to carry an electrical current to form the inductive connection. By implementing the inductive element 502 as a primary coil on a substrate (e.g., polyimide substrate) with a sinusoidal trace pattern and elliptical perforations 504, the inductive element 502 becomes both flexible and stretchable to allow the flexible loop to collapse when not used and to resist damage during the insertion and removal of a peripheral device 122 such as a stylus 302.

FIG. 6 depicts an example implementation 600 in which the inductive element 502 of FIG. 5 is bent to form a flexible loop 502. As illustrated the perforations 504 of the inductive element 502 permit bending to form a loop. The perforations 504 may also permit stretching such as to provide an elastic force to retain a peripheral device 122 within the flexible loop 216 as previously described. The traces 508 are configured to form an inductive electrical field within an interior of the flexible loop 214 thereby forming an inductive communicative coupling.

Figure 7:
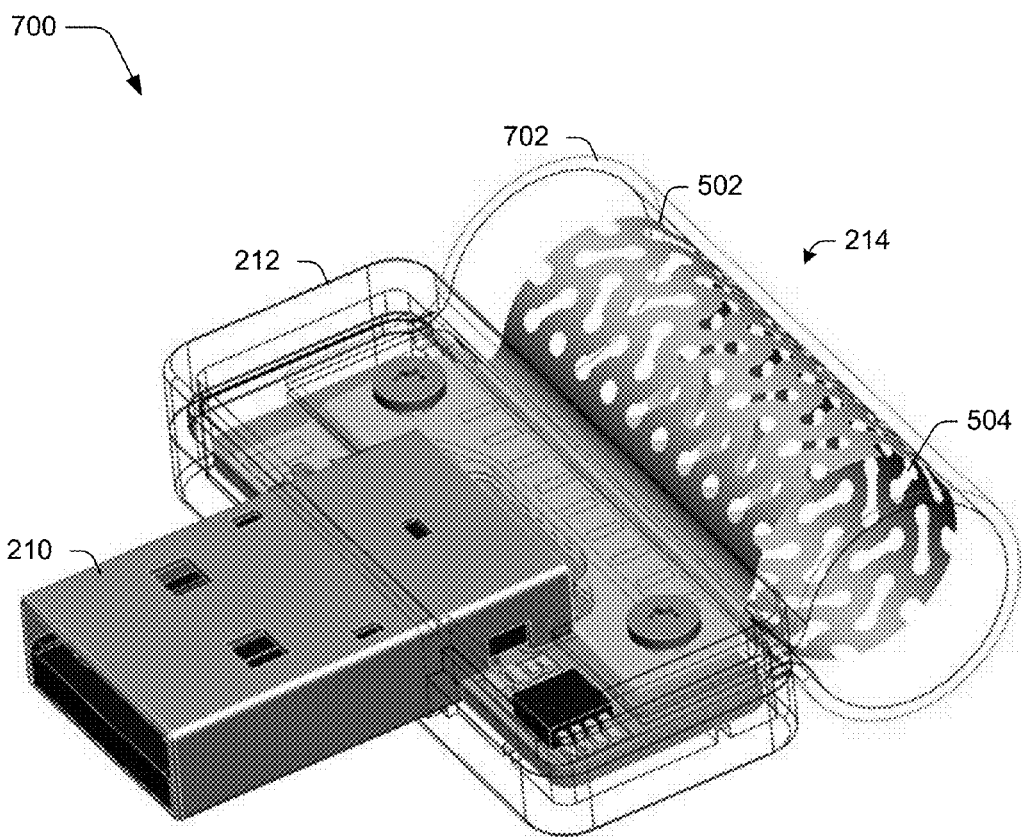
FIG. 7 depicts an example implementation in which the inductive element of FIG. 6 is installed as part of the peripheral retention device of FIG. 2.

FIG. 7 depicts an example implementation 700 in which the inductive element 502 of FIG. 6 is installed as part of the peripheral retention device 110 of FIG. 2. In this example, the inductive element 502 (e.g., primary coil) is configured as a flexible loop that is surrounded by a fabric 702. The inductive element 502 is communicatively coupled to the plug 210 as part of the peripheral securing portion 212 and thus may receive electricity from a communication port 128 of a device as previously described.

Conventionally, a primary coil of an air gap transformer for accessory charging is constructed flat as a "charging pad". However, wrapping a primary coil around the secondary coil increases efficiency in a transfer of power from the charger to the accessory, e.g., by over seventy-seven percent. Testing of this prototype (FIG. 1) has yielded an efficiency of up to 77% and indicates that it is feasible to fully charge a 160 mA Lithium rechargeable stylus in approximately an hour and approximately half an hour for a super-capacitor cell.

Figure 8:
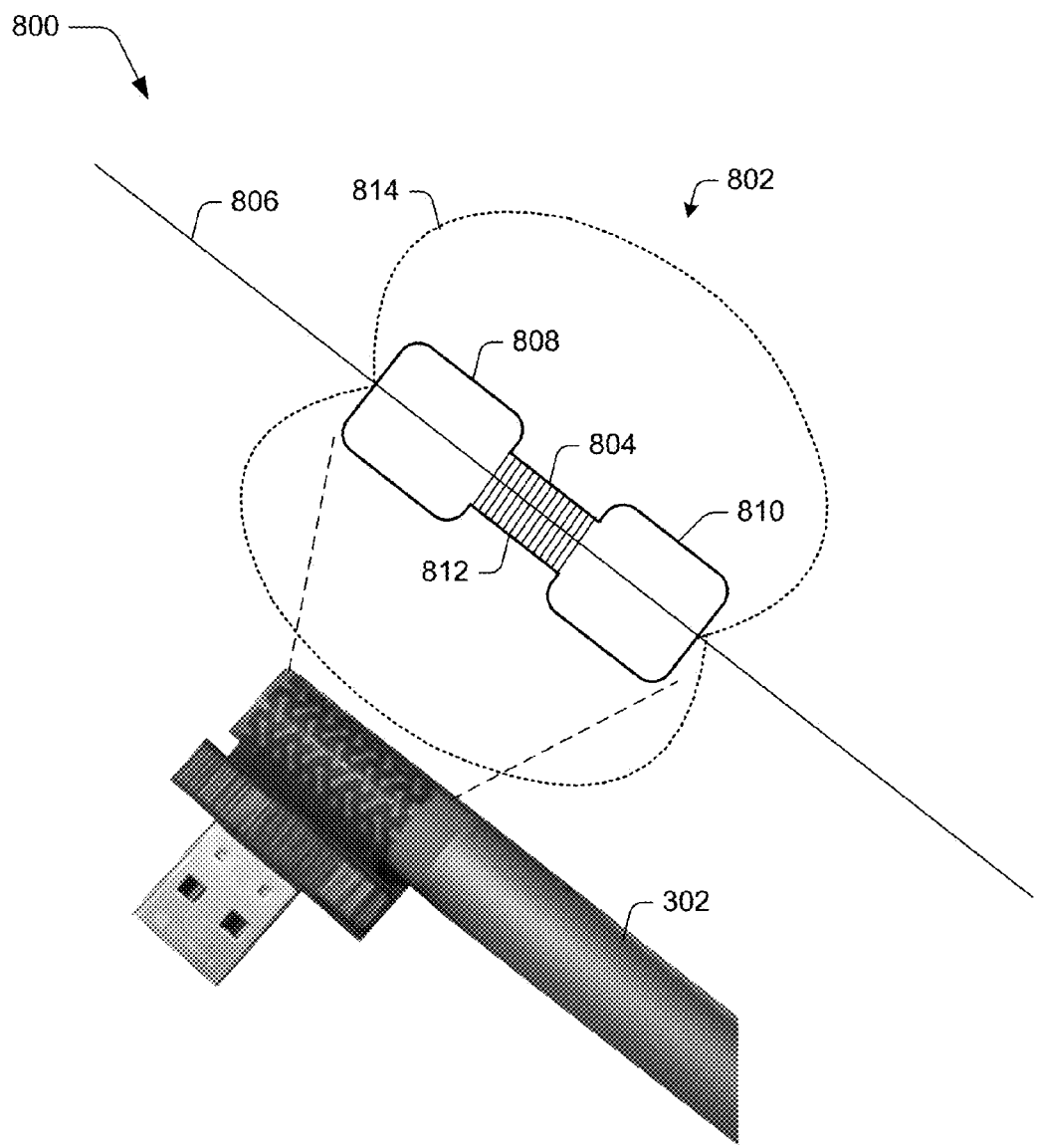
FIG. 8 depicts an example implementation of secondary coil usage by a peripheral device of FIG. 1 to form an inductive communicative coupling between devices.

FIG. 8 depicts an example implementation 800 of a secondary coil usage by a peripheral device 122 of FIG. 1 for form an inductive communicative coupling between devices. Conventional secondary coils of air gap transformers are typically three centimeters by four centimeters and larger, making them difficult to place in peripheral devices 122 such as a stylus 302.

Accordingly, an inductive coil 802 in this example is formed from a single ferrous element, which in this example is a single integral piece having a middle portion 804 having a diameter about an axis 806 that is less than a diameter of opposing ends 808, 810 of the single ferrous element along the axis 806.

A coil 812 is wrapped around the middle portion 804 such that the coil 812 and the single ferrous element form an inductive coil 802 that is substantially rotationally invariant around the axis. The inductive coil 802 may include an open tunnel (e.g., similar to a pipe) running through a longitudinal access, which may be used to permit wires to be run through the tunnel to support communication from one end of the stylus to the other. The diameter of the opposing ends 808, 810 allow the ferrous material to extend to an edge of a housing of the stylus 302 and the cylindrical shape makes coupling rotationally invariant by forming flux lines 814 in a shape that mimics a donut as illustrated. This secondary coil assembly can be made small and dense enough to fit well in a stylus 302 while transferring enough power to charge an internal battery in any rotational position.

Inductive coupling between primary and secondary coils is sensitive to the distance between the coils. The smaller the coils, the faster this loss of coupling occurs. Further, the stylus 302 may typically be stored in a way that does not constrain a longitudinal rotational position of the stylus. Therefore, by using a shape that mimics a dumbbell as shown in FIG. 8, the inductive coil 802, in this instance operating as a secondary coil, may minimize a distance to the primary coil of the peripheral retention device 110 while having good coupling at any longitudinal rotational angle. Although described as a secondary coil in this example, the inductive coil 802 may also function as a primary coil as further described below.

Figure 9:
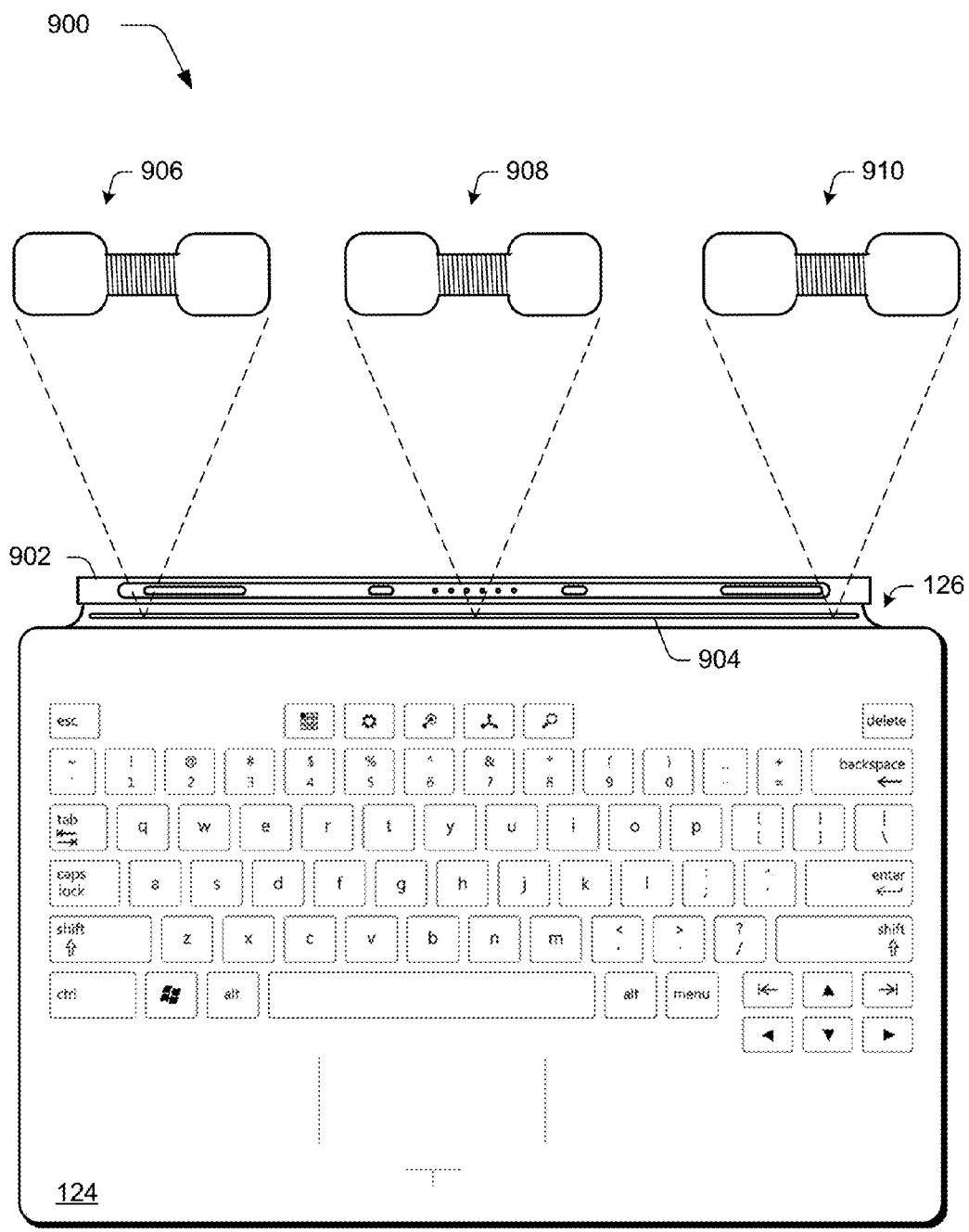
FIG. 9 depicts an example implementation in which an inductive coil of FIG. 8 is configured to operate as a primary coil in an air gap transformer arrangement.

FIG. 9 depicts an example implementation 900 in which an inductive coil of FIG. 8 is configured to operate as a primary coil in an air gap transformer arrangement. In this example, a connection portion 902 of the input device 124 is shown that is configured to provide a communicative and physical connection between the input device 124 and the computing device 102. The connection portion 902 as illustrated has a height and cross section configured to be received in a channel in the housing of the computing device 102, although this arrangement may also be reversed without departing from the spirit and scope thereof.

The connection portion 902 is flexibly connected to a portion of the input device 104 that includes the keys through use of the flexible hinge 126. Thus, when the connection portion 202 is physically connected to the computing device the combination of the connection portion 902 and the flexible hinge 126 supports movement of the input device 124 in relation to the computing device 102 that is similar to a hinge of a book.

The flexible hinge 126 in this example includes a midspine 904 having a plurality of inductive coils 906, 908, 910 that are configured similar to the inductive coil 902 of FIG. 8 but in this instance operate as primary coils of an air gap transformer. Thus, to form a communication coupling between the input device 124 (and thus the computing device 102 of FIG. 1) to a stylus 302 of FIG. 3 or other peripheral device 122 in this example a user may rest the stylus 302 against the flexible hinge or secure it thereto using a pen clip of the stylus 302 to cause an inductive coupling. This may be utilized to charge the stylus, transfer data (e.g., to authenticate the peripheral device 122), and so on as previously described. Further, flux flow lines may also support a rotationally invariant shape such that the flexible hinge 126 may move yet still support the communicative coupling.

Figure 10:
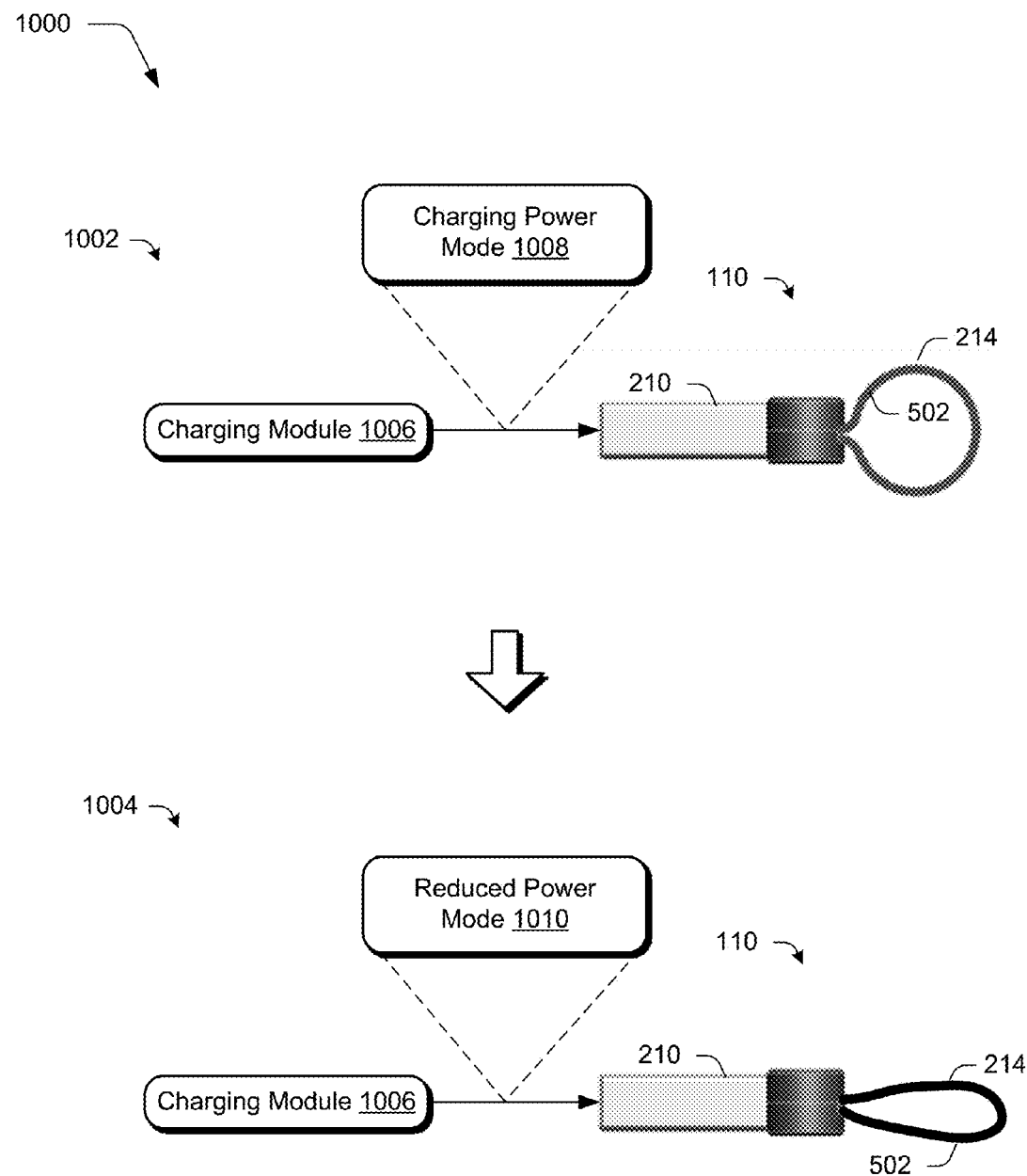
FIG. 10 depicts an example implementation in which power modes are utilized to control an amount of power provided to the inductive element of FIG. 5 of the peripheral retention device of FIG. 2.

FIG. 10 depicts an example implementation 1000 in which power modes are utilized to control an amount of power provided to the inductive element 502 of the peripheral retention device 110. This example implementation is shown using first and second stages 1002, 1004. A charging module 1006 is illustrated at each of the stages that is representative of functionality to control an amount of power provided by the peripheral retention device 110 to the inductive element 502. The charging module 1006, for instance, may be incorporated as part of the peripheral retention device 110 itself, a device to which the peripheral retention device 110 is attached (e.g., the computing device 102), and so forth.

At the first stage 1002, a charging module 1006 detects that the flexible loop 214 and corresponding inductive element 502 is arranged as a loop, such as the insertion of a pen. This may be determined by measuring inductance of the inductive element 502 by the charging module 1006. The ferrite secondary receiving coil inside the pen causes a significant increase in the inductance of the inductive element 502. Thus, the charging module 1006 may determine that the inductive element 502 is configured to support a communicative coupling and may provide a level of power sufficient to charge a peripheral device 122, e.g., power mode 1008.

At the second stage 1004, however, the charging module 1006 detects that the flexible loop 214 and corresponding inductive element 502 has collapsed. This may be detected by the charging module 1006 by detecting that the inductive element 502 exhibits low inductance. For example, opposing sides of the charging module 1006 may cause a short when disposed closely to each other, such as when the flexible loop 214 collapses or flattens.

Accordingly, the charging module 1006 may detect that the flexible loop 214 and corresponding collapsed or shorted state and enter a reduced power mode 1010 that supplies less power to the inductive element 502 than when in the charging power mode 1008, e.g., may cease providing power all together, periodically provide power to determine inductance of the inductive element and thus whether to enter the charging power mode 1008, and so forth. In this way, the charging module 1006 may determine whether the peripheral retention device 110 is configured to perform inductance and react accordingly, such as to conserver power when not ready, transfer data, and so forth. Further discussion of this technique may be found in relation to FIG. 12.

FIG. 11 depicts an example implementation of a circuit 1100 usable by the peripheral retention device 110 to act as a primary coil of an air gap transformer. As before, the primary coil may be utilized to transfer power to charge a peripheral device 122, transfer data, and so forth.

Example Procedures

The following discussion describes inductive peripheral retention device techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the figures described above.

Functionality, features, and concepts described in relation to the examples of FIGS. 1-11 may be employed in the context of the procedures described herein. Further, functionality, features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples.

Figure 12:
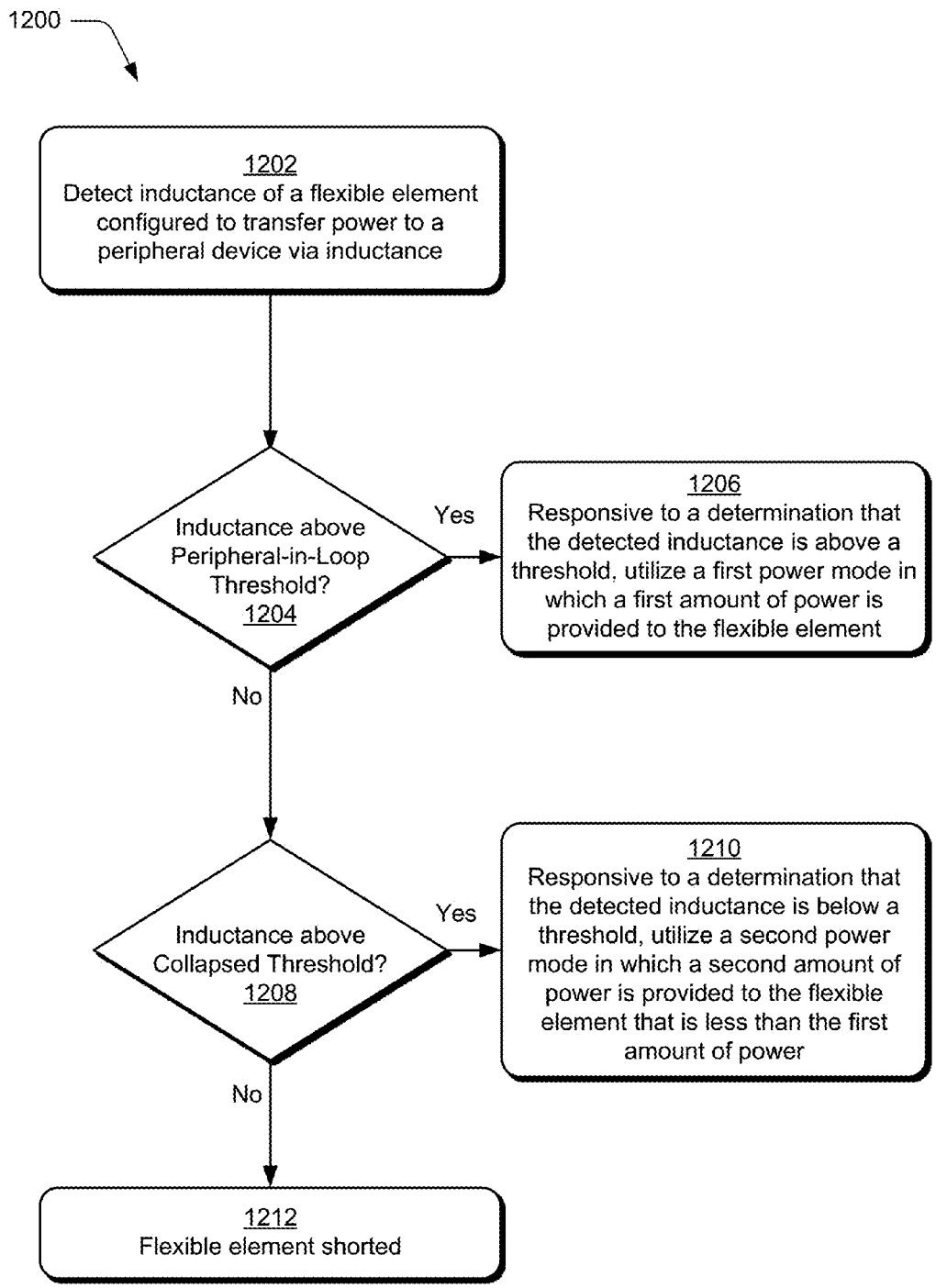
FIG. 12 is a flow chart depicting a procedure in an example implementation in which power modes are utilized based on a determination of a detection of inductance of a flexible loop.

FIG. 12 depicts a procedure 1200 in an example implementation in which power modes are utilized based on a determination of a detection of inductance of a flexible loop. There are three inductance scenarios, which may be detected and leveraged based on detection of inductance and/or current. These a scenario in which a peripheral device is not inserted (e.g., which has low inductance), a scenario in which a peripheral device is inserted (e.g., which has ten times the inductance of when a device is not inserted), and when an inductive element is not aligned with the flexible element but another metallic item is, which has the lowest inductance. Accordingly, thresholds may be utilized to differentiate between these scenarios, an example of which is described as follows.

Inductance is detected of a flexible element configured to transfer power to a peripheral device via inductance (block 1202). A charging module 1006, for instance, may measure inductance to determine whether the inductive element 502 is or is not experiencing a short.

At decision block 1204, a determination is made as to whether inductance is above a peripheral-in-loop threshold (decision block 1204). If so, ("yes" from decision bock 1204), responsive to a determination that the detected inductance is above a threshold, a first power mode is utilized in which a first amount of power is provided to the flexible element (block 1206). The threshold, for instance, may be set that is indicative of whether the inductive element is experiencing a short, set at an amount of inductance detected at a desired shape of the flexible element, e.g., the flexible loop 214 and corresponding inductive element 502) loop 214. If so, the charging module 1008 may provide an amount of power sufficient to transfer data, charge a peripheral device 122, and so forth.

In not ("no" from decision block 1204), a determination is made as to whether inductance is above a collapsed threshold (decision block 1208). If so ("yes" from decision block 1208), responsive to a determination that the detected inductance is below a threshold, a second power mode is utilized in which a second amount of power is provided to the flexible element that is less than the first amount of power (block 1210). This threshold may be the same or different than the previous threshold, e.g., may be set such that inductance levels below the threshold are indicative of a short, set for inductance levels detected at a flattened/collapsed shape of the flexible element (e.g., the flexible loop 214 and corresponding inductive element 502), and so forth.

If inductance is not above a collapsed threshold ("no" from decision block 1208), a determination is made that the flexible element is shorted (block 1212). A short circuit may be detected by inductance and also by detection of an excessive current draw above a threshold. Thus, a second power level may be employed, e.g., to "turn off" power to the inductive element 502, periodically check inductance at predetermined intervals of time, provide a minimal level of current usable to make the detection, and so forth. A timing profile may also be incorporated (e.g., 10 milliseconds on, two seconds off) to improve power savings. A variety of other examples are also contemplated without departing from the spirit and scope thereof.

Example System and Device

Figure 13:
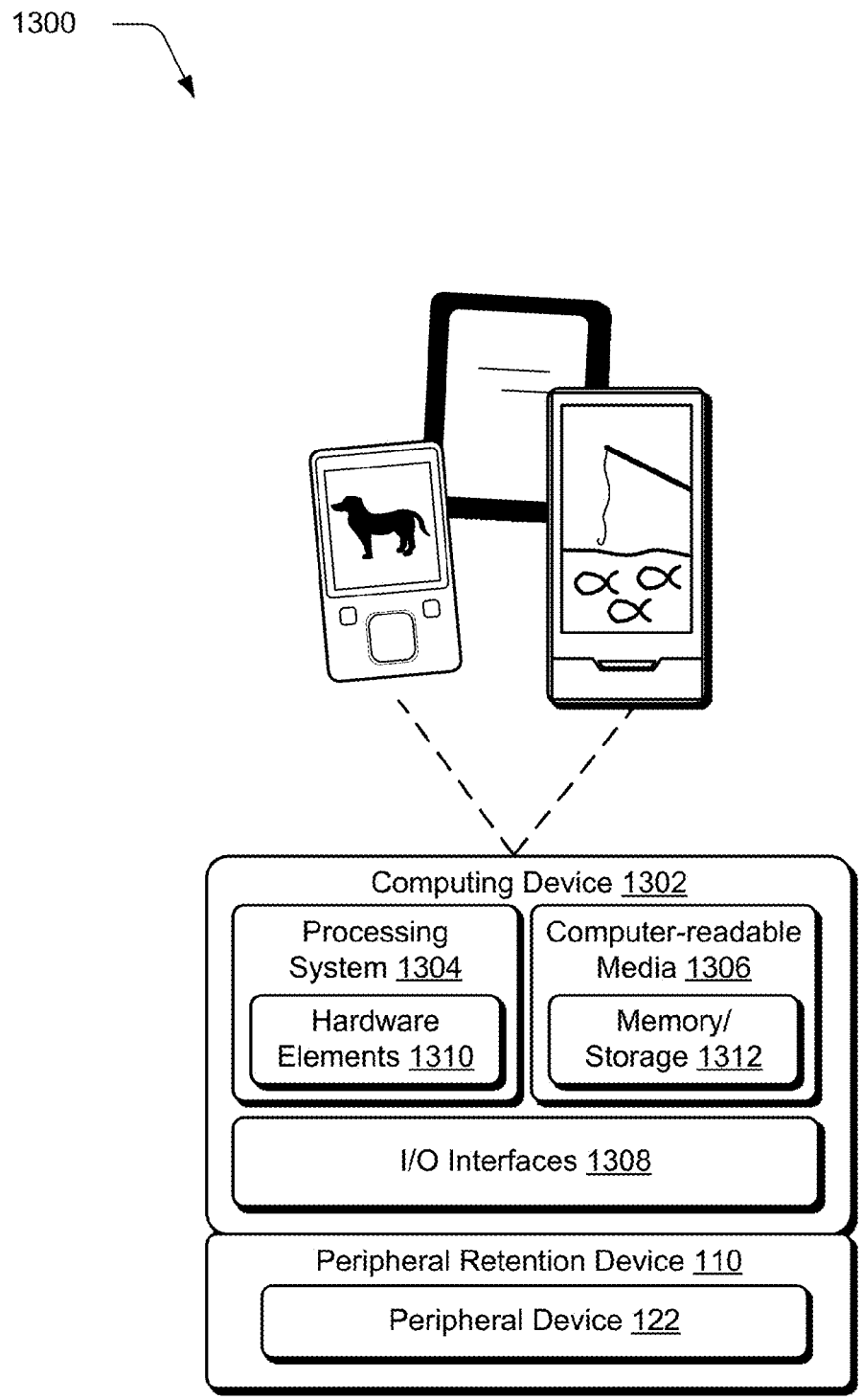
FIG. 13 illustrates an example system including various components of an example device that can be implemented as any type of computing device as described with reference to FIGS. 1-12 to implement embodiments of the techniques described herein.

FIG. 13 illustrates an example system generally at 1300 that includes an example computing device 1302 that is representative of one or more computing systems and/or devices that may implement the various techniques described herein. The computing device 1302 may be, for example, be configured to assume a mobile configuration through use of a housing formed and size to be grasped and carried by one or more hands of a user, illustrated examples of which include a mobile phone, mobile game and music device, and tablet computer although other examples are also contemplated. A peripheral retention device 110 is also included, which may be used to retain a peripheral device 122 as described above.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways to support user interaction.

The computing device 1302 is further illustrated as being physically coupled to a peripheral device 1314 that is physically removable from the computing device 1302, e.g., using magnetism. In this way, a variety of different input devices may be coupled to the computing device 1302 having a wide variety of configurations to support a wide variety of functionality.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method comprising:
   detecting inductance of a flexible element configured to transfer power to a peripheral device via inductance;
   responsive to determining that the detected inductance of the flexible element is above a first threshold, utilizing a first power mode in which a first amount of power is provided to the flexible element; and
   responsive to determining that the detected inductance of the flexible element is below a second threshold, utilizing a second power mode in which a second amount of power is provided to the flexible element that is less than the first amount of power.

2. A method as described in claim 1, wherein utilizing the first power mode comprises providing a first amount of power to the flexible element.

3. A method as described in claim 2, wherein utilizing the second power mode comprises providing a second amount of power to the flexible element.

4. A method as described in claim 3, wherein the second amount of power is less than the first amount of power.

5. A method as described in claim 3, wherein the first amount of power is sufficient to cause charging of the peripheral device and the second amount of power does not provide power to the flexible element.

6. A method as described in claim 1, wherein the determining that the detected inductance of the flexible element is below the second threshold is indicative that the flexible element is in a collapsed state such that opposing sides of the flexible element are disposed proximal to each other.

7. A method as described in claim 6, wherein the determining that the detected inductance of the flexible element is above the second threshold is indicative that the flexible element is not in the collapsed state.

8. A method as described in claim 1, wherein the flexible element is formed as a loop.

9. The method of claim 1, wherein the determining that the detected inductance of the flexible element is above the first threshold indicates that the peripheral device is in contact with the flexible element.

10. A system comprising:
    a flexible element configured to transfer power to a peripheral device via inductance; and
    at least a memory and a processor to implement a charging module, the charging module configured to perform operations comprising:
    detecting inductance of the flexible element;
    responsive to determining that the detected inductance of the flexible element is above a first threshold, utilizing a first power mode; and
    responsive to determining that the detected inductance of the flexible element is below a second threshold, utilizing a second power mode.

11. The system of claim 10, wherein utilizing the first power mode comprises providing a first amount of power to the flexible element.

12. The system of claim 11, wherein utilizing the second power mode comprises providing a second amount of power to the flexible element.

13. The system of claim 12, wherein the second amount of power is less than the first amount of power.

14. The system of claim 12, wherein the first amount of power is sufficient to cause charging of the peripheral device and the second amount of power does not provide power to the flexible element.

15. The system of claim 10, wherein the determining that the detected inductance of the flexible element is below the second threshold is indicative that the flexible element is in a collapsed state such that opposing sides of the flexible element are disposed proximal to each other.

16. The system of claim 15, wherein the determining that the detected inductance of the flexible element is above the second threshold is indicative that the flexible element is not in the collapsed state.

17. The system of claim 10, wherein the flexible element is formed as a loop.

18. One or more computer-readable storage devices comprising instructions stored thereon that, responsive to execution by one or more processors, perform operations comprising:
    detecting inductance of a flexible element configured to transfer power to a peripheral device via inductance;
    responsive to determining that the detected inductance of the flexible element is above a first threshold, utilizing a first power mode in which a first amount of power is provided to the flexible element; and
    responsive to determining that the detected inductance of the flexible element is below a second threshold, utilizing a second power mode in which a second amount of power is provided to the flexible element that is less than the first amount of power.

19. The one or more computer-readable storage devices of claim 18, wherein the first amount of power is sufficient to cause charging of the peripheral device and the second amount of power does not provide power to the flexible element.

20. The one or more computer-readable storage devices of claim 18, wherein the determining that the detected inductance of the flexible element is below the second threshold is indicative that the flexible element is in a collapsed state such that opposing sides of the flexible element are disposed proximal to each other.

* * * * *